United States Patent [19]

Vidwans et al.

[11] Patent Number: 5,463,745
[45] Date of Patent: Oct. 31, 1995

[54] METHODS AND APPARATUS FOR DETERMINING THE NEXT INSTRUCTION POINTER IN AN OUT-OF-ORDER EXECUTION COMPUTER SYSTEM

[75] Inventors: Rohit A. Vidwans, Beaverton; Darrell D. Boggs, Aloha; Michael A. Fetterman; Andrew F. Glew, both of Hillsboro, all of Oreg.

[73] Assignee: Intel Corporation, Santa Clara, Calif.

[21] Appl. No.: 174,074

[22] Filed: Dec. 22, 1993

[51] Int. Cl.⁶ ............................................ G06F 9/38
[52] U.S. Cl. .................. 395/375; 364/946.2; 364/262.4
[58] Field of Search .................................. 395/375, 775, 395/800

[56] References Cited

U.S. PATENT DOCUMENTS

| | | | |
|---|---|---|---|
| 4,991,090 | 2/1991 | Emma et al. | 395/575 |
| 5,127,093 | 6/1992 | Moore | 395/375 |
| 5,151,981 | 9/1992 | Westcott et al. | 395/375 |
| 5,185,871 | 2/1993 | Frey et al. | 395/375 |
| 5,202,975 | 4/1993 | Rasbold et al. | 395/375 |
| 5,202,993 | 4/1993 | Tarsy et al. | 395/700 |

*Primary Examiner*—David Y. Eng
*Attorney, Agent, or Firm*—Blakely, Sokoloff, Taylor & Zafman

[57] ABSTRACT

Instructions are fetched and issued by an instruction fetch and issue circuit with the instructions' sizes in program order. An allocate circuit allocates reservation station entries in a reservation station circuit, and reorder buffer entries in a reorder circuit, for the issued instructions in order, storing the instructions' sizes in the allocated reorder buffer entries. The reservation and dispatch circuit dispatches the issued instructions to the execution circuits for execution when they are ready. The execution circuits store the result data including target addresses of branch instructions into the corresponding reorder buffer entries. During each retirement operation, a retire circuit reads the instruction sizes and the target addresses for a predetermined number of issued instructions from their allocated reorder buffer entries. The retire circuit determines two or more speculative next instruction pointers for each of the issued instructions, factoring into consideration whether the issued instructions are branch instructions or not, and their relative positions to each other. Each of the speculative next instruction pointers indicates what the next instruction pointer for the processor should be for retiring a particular combination of the result data values of the issued instructions under consideration. The retire circuit conditionally updates the next instruction pointer with one of the speculative next instruction pointers, depending on how many, if any, of the instructions can actually retire, and whether any of the actually retiring instructions are branch instructions.

22 Claims, 12 Drawing Sheets

METHODS AND APPARATUS FOR DETERMINING THE NEXT INSTRUCTION POINTER IN AN OUT-OF-ORDER EXECUTION COMPUTER SYSTEM

BACKGROUND OF THE INVENTION

1. Field of the Invention

The present invention relates to the field of computer systems. More specifically, the present invention relates to determining the next instruction pointer on an out-of-order execution computer systems.

2. Background

Typical prior computer processors implement in-order instruction execution pipelines. An in-order processor usually fetches an instruction stream from a memory, issues and executes each instruction in the instruction stream according to a program order. Typically, such an in-order processor determines the program order as the instructions are executed. An instruction pointer that specifies a next instruction in the instruction stream to be executed is continuously updated with the execution of each instruction.

Some prior processors implement a mechanism for limiting the valid range of the instruction pointer. Such an instruction pointer limitation is commonly implemented in conjunction with a mechanism for providing a relocatable base address for the instruction stream. The instruction pointer limitation provides a protected range of memory extending from the relocatable base that prevents erroneous program execution across program modules.

For example, one prior processor provides a code segment base register that defines a base address for the instruction stream, and an instruction pointer limit register that defines the valid range of the instruction pointer from the base address.

An in-order processor usually enforces such an instruction pointer limit by determining whether a new next instruction pointer exceeds the instruction pointer limit as the new next instruction pointer is determined. If the new next instruction pointer exceeds the instruction pointer limit, the processor typically performs a predefined operation to indicate an instruction pointer limit violation.

An instruction stream typically contains certain instructions that cause discontinuities in the program order. For example, jump instructions, call instructions, and return instructions may cause the processor to redirect the instruction pointer to a discontinuous location in the memory defined by a target address. Such instructions that cause discontinuities in the program order are hereinafter referred to as branch instructions.

A branch instruction may be a conditional branch instruction or an unconditional branch instruction. A conditional branch instruction may or may not cause a discontinuity in the program order. The processor typically tests the execution results of prior instructions to determine whether a conditional branch is taken. In addition, the processor may require the execution results of prior instructions to determine a target address for a conditional or an unconditional branch instruction.

A processor must resolve such discontinuities before determining the next instruction pointer and enforcing an instruction pointer limit. In-order instruction execution ensures that such discontinuities are resolved prior to the determination of the next instruction pointer and the enforcement of the instruction pointer limit.

A processor may implement an out of order instruction execution pipeline to increase instruction execution performance. Such a processor fetches an instruction stream from a memory, issues the instructions in program order, but executes the issued instructions as soon as they are ready, even if there are not ready instructions issued at an earlier time. A ready instruction is typically an instruction having fully assembled source data. The result data of the executed instructions are subsequently retired or committed to an architectural state in program order in due course.

Such out of order execution improves processor performance because the instruction execution pipeline of the processor does not stall while assembling source data for a non ready instruction. For example, a non ready instruction awaiting source data from an external memory fetch does not stall the execution of later instructions in the instruction stream that are ready to execute.

However, a processor that implements an out of order instruction execution pipeline creates complications for determining the next instruction pointer and enforcing an instruction pointer limit because such a processor generates the result data for the instructions out of order. The result data is out of order because the instructions that cause generation of the result data are executed out of order. As a consequence, such a processor cannot properly determine the next instruction pointer and perform an instruction pointer limit check as such instructions are executed.

An out-of-order execution processor may also implement a speculative instruction execution pipeline to increase instruction execution performance. A processor employing speculative instruction execution typically determines a speculative execution path through a program by predicting the outcome of conditional branch instructions. Such a processor fetches an instruction stream from a memory, predicts whether conditional branch instructions in the instruction stream will result in a branch, and continues fetching and executing the instruction stream according to the prediction. Execution results of mid-predicted branches are purged upon detection of the mis-predictions. Such speculative execution increases processor performance because the instruction execution pipeline does not stall during the resolution of conditional branch instructions.

However, a processor that implements a speculative out of order instruction execution pipeline creates further complications for determining the next instruction pointer and enforcing an instruction pointer limit, because the out-of order result data generated by such a processor for some of the instructions are speculative. The result data is speculative until the branch prediction that caused speculative execution of the instructions is resolved. In such a processor, prior discontinuities in the instruction stream may not be resolved when an instruction executes. In addition, the execution results of prior instructions that are required to determine a target address or condition of a branch instruction may not be available when the branch instruction executes. As a consequence, such a processor must overcome the speculativeness of the result data as well as their out-of-order generation to properly determine the next instruction pointer and perform an instruction pointer limit check.

An out-of-order execution processor may also implement a concurrent instruction retirement pipeline to increase instruction execution performance. A processor employing concurrent instruction retirement typically can retire a number of executed instructions concurrently, up to but not exceeding a predetermined ceiling. Such a processor examines a predetermined number of dispatched instructions at each retirement operation, determines whether any of the dispatched instructions are executed and their result data are ready for retirement or commitment to the architectural state, and retires or commits the result data accordingly. Such concurrent retirement of multiple executed instructions increases processor performance because executed instructions are retired or committed at a higher rate.

However, a processor that implements concurrent instruction retirement pipeline also creates further complications for solving the speculativeness and out-of-order generation of the result data for determining the next instruction pointer and enforcing an instruction pointer limit, because the result data of varying number of executed instructions are retired or committed during each retirement operation. As a consequence, if such a processor is to overcome the speculativeness and out-of-order generation of the result data at retirement to properly determine the next instruction pointer and perform an instruction pointer limit check, the processor must account for the varying number of retiring instructions.

Some out of order processors may fetch an instruction stream from a memory, and convert each instruction of the incoming stream into a sequence of micro-ops according to the sequential program order. A branch macro instruction is converted in a sequence of micro-ops having a corresponding branch effecting micro-op. Depends on implementations, the branch effecting micro-op might be placed in a fixed or variable location in a micro-op sequence. Such an out of order processor then issues the micro-ops in order, but executes the micro-ops according to the availability of source data and execution resources rather than the program order. The result data of the executed micro-ops are subsequently retired or committed to the architectural state in due course. Such conversion of instructions into micro-ops increases processor compatibility because the micro-ops can take advantage of hardware advancements while maintaining compatibility at the macro instruction level.

However, a processor that implements a micro instruction pipeline also creates further complications for solving the speculativeness and out-of-order generation of the result data for determining the next instruction pointer and enforcing an instruction pointer limit, because the result data are retired or committed at the micro instruction level while the next instruction pointer and the instruction pointer limit are at the macro instruction level. As a consequence, if such a processor is to overcome the speculativeness and out-of-order generation of the result data at retirement to properly determine the next instruction pointer and perform an instruction pointer limit check for the macro instructions, the processor must account for potential duplicate contributions to the next instruction pointer, and depending on implementation, the placement of branch effecting micro-op in a micro-op sequence.

A micro-op is also referred as a micro instruction in the art. However, for clarity, an instruction will be described herein as being converted into a number of micro-ops. A person skill in the art will appreciate that to the execution units, a micro-op is an "instruction". Moreover, a processor that does not expand instructions into sequences of micro-ops can be thought of as a special case where instructions are always "expanded" to "sequences" of one micro-op.

SUMMARY OF THE INVENTION

One object of the present invention is to determine the next instruction pointer in a processor that performs speculative instruction execution.

Another object of the present invention is to determine the instruction pointer in a processor that performs out-of-order instruction execution.

A further object of the present invention is to determine the next instruction pointer in a processor that performs speculative out-of-order instruction execution.

Another object of the present invention is to determine the next instruction pointer in a processor that performs speculative out-of-order instruction execution and potentially commits more than one instruction to an architectural state during each retirement operation.

Another object of the present invention is to determine the next instruction pointer in a processor that performs speculative out-of-order instruction execution and converts instructions into one or more micro-ops.

A further object of the present invention is to determine the next instruction pointer in a processor that performs speculative out-of-order instruction execution, converts instructions into one or more micro-ops, and potentially commits more than one micro instruction to an architectural state during each retirement operation.

These and other objects of the invention are provided by a method and apparatus for determining the next instruction pointer in an out-of-order execution processor. Instructions are fetched and issued by an instruction fetch and issue circuit with the instructions' sizes in program order. An allocate circuit allocates reservation station entries in a reservation station circuit, and reorder buffer entries in a reorder circuit, for the issued instructions in order, storing the instructions' sizes in the allocated reorder buffer entries. The reservation and dispatch circuit dispatches the issued instructions to the execution circuits for execution when they are ready. The execution circuits store the result data including target addresses of branch instructions into the corresponding reorder buffer entries.

During each retirement operation, a retire circuit reads the instruction sizes and the target addresses for a predetermined number of issued instructions from their allocated reorder buffer entries. The retire circuit determines two or more speculative next instruction pointers for each of the issued instructions, factoring into consideration whether the issued instructions are branch instructions or not, and their relative positions to each other. Each of the speculative next instruction pointers indicates what the next instruction pointer for the processor should be for retiring a particular combination of the result data values of the issued instructions under consideration. The retire circuit conditionally updates the next instruction pointer with one of the speculative next instruction pointers, depending on how many, if any, of the instructions can actually retire, and whether any of the actually retiring instructions are branch instructions.

In one embodiment, where the fetched instructions issued as one or more micro-ops, the instruction fetch and issue circuit further issues the micro-ops with flow markers, marking the beginning and end of a sequence of micro-ops for a fetched macro instruction. The retire circuit determines speculative next macro instruction pointers for each of the issued micro-ops read, further factoring into consideration potential duplicate contributions in advancing the next macro instruction pointer and placement of branch effecting micro-ops in micro-op sequences. Similarly, the retire circuit further accounts for the placement of the branch effecting ops in micro-op sequences, when determining which one of the speculative next macro instruction pointers, if any, is to be used to update the next macro instruction pointer.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
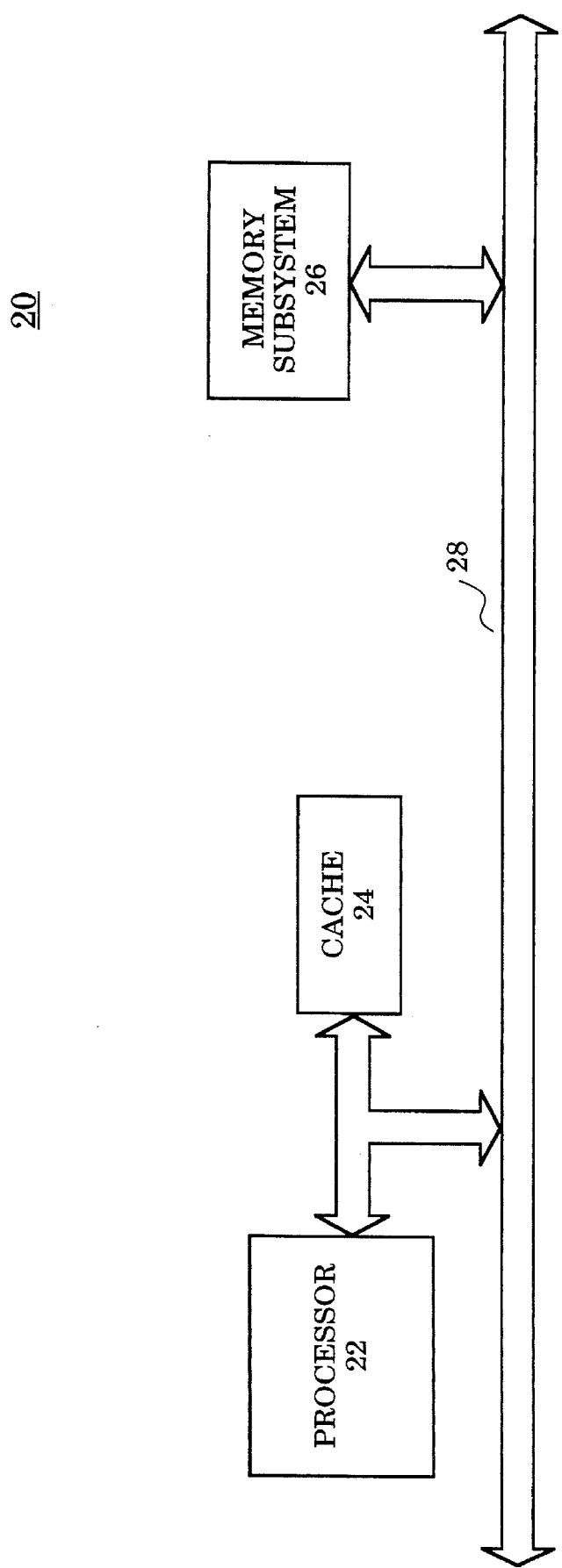
FIG. 1 illustrates a computer system comprising a processor, a cache, and a memory subsystem.

FIG. 1 illustrates a computer system 20. The computer system 20 comprises a processor 22, a cache circuit 24, and a memory subsystem 26. The processor 22, the cache circuit 24 and the memory subsystem 26 communicate over a host bus 28. The processor 22 and the cache circuit 24 are preferably disposed on a single silicon based chip. However, based on the descriptions to follow, it will be appreciated that the processor 22 and the cache circuit 24 may be disposed on one or more chips based on silicon or other like semiconductor materials. However, based on the descriptions to follow, it will be appreciated that the present invention may be practiced on processor and cache circuit disposed on one or more chip based on silicon or other like semiconductor materials.

The processor 22 fetches a stream of macro instructions from the memory subsystem 26 over the host bus 28 through the cache circuit 24. The processor 22 executes the stream of macro instructions and maintains data storage in the memory subsystem 26.

The cache circuit 24 is an instruction cache for macro instructions executed by the processor 22. The cache circuit 24 is also preferably a data cache for the processor 22.

Figure 2:
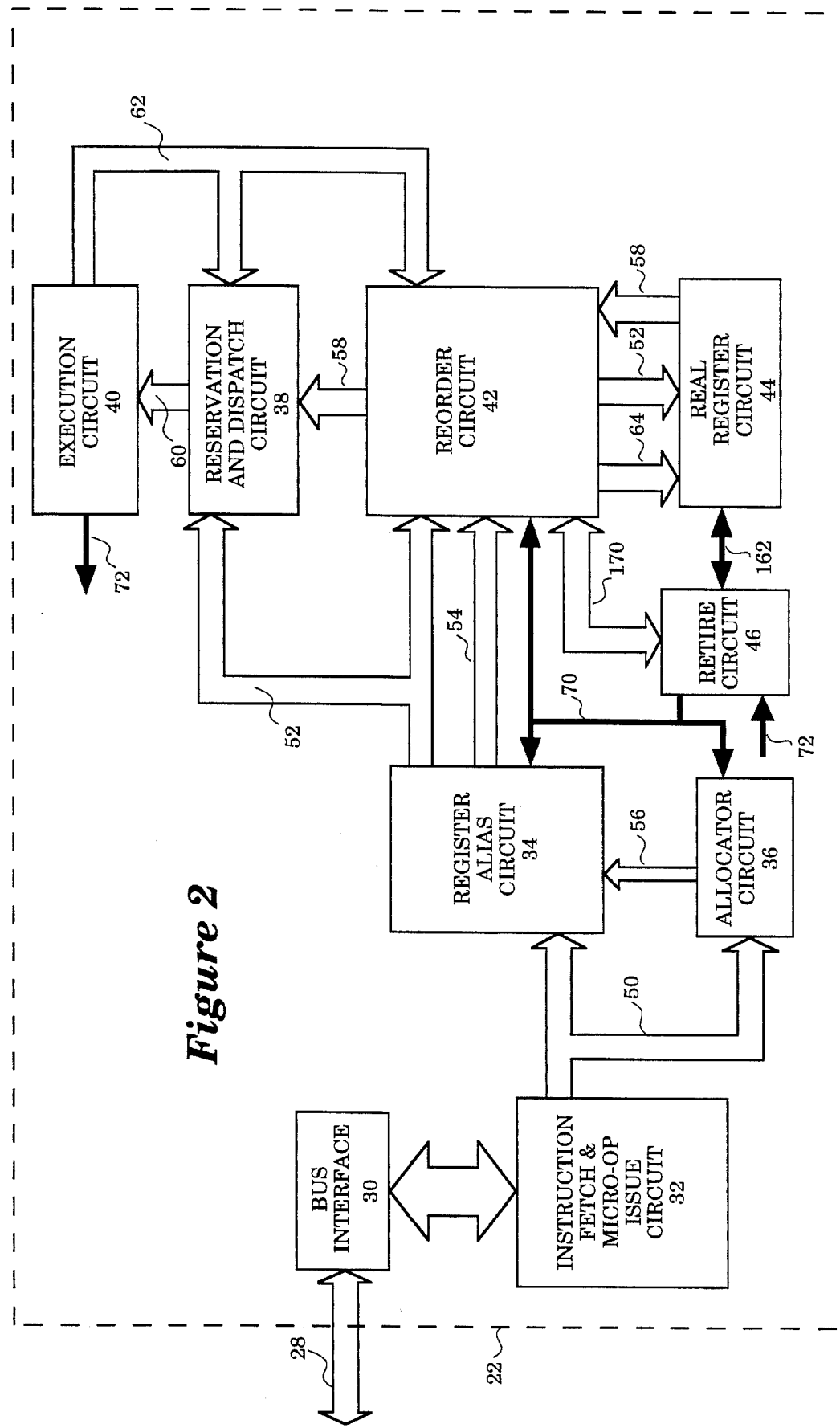
FIG. 2 is a block diagram of a processor for one embodiment.

FIG. 2 illustrates the processor 22. The processor 22 comprises a bus interface circuit 30 and an instruction fetch and micro-op issue circuit 32, a register alias circuit 34, and an allocator circuit 36. The processor 22 also comprises a reservation and dispatch circuit 38, an execution circuit 40, a reorder circuit 42, a real register circuit 44, and a retire circuit 46.

The bus interface circuit 30 enables transfer of address, data and control information over the multiprocessor bus 28. The instruction fetch and micro-op issue circuit 32 fetches a stream of macro instructions from the memory subsystem 26 over the multiprocessor bus 28 through the bus interface circuit 30. The instruction fetch and micro-op issue circuit 32 implements speculative branch prediction to maximize macro-instruction fetch throughput.

For one embodiment, the stream of macro instructions fetched over the multiprocessor bus 28 comprises a stream of Intel Architecture Microprocessor macro instructions, which are variable in size. The Intel Architecture Microprocessor macro instructions operate on a set of architectural registers, including an EAX register, an EBX register, an ECX register, and an EDX register, etc., as well as floating-point registers.

The instruction fetch and micro-op issue circuit 32 preferably converts each macro-instruction of the incoming stream of macro instructions into an in-order sequence of logical micro-operations, hereinafter referred to as logical micro-ops. The logical micro-ops corresponding to each macro instruction are reduced instruction set micro-operations that perform the function of the corresponding macro instruction. The logical micro-ops specify arithmetic and logical operations as well as load and store operations to the memory subsystem 26. The logical micro-op that actually effectuates discontinuous program order change for a branch macro instruction is preferably always generated as the last logical micro-op of the micro-op sequence of the branch macro instruction. Such logical micro-ops that actually effectuate discontinuous program order change for branch macro instructions are hereinafter referred to as branch effecting micro-ops.

In an alternate embodiment, where three micro-ops are considered for retirement at each retirement operation, a branch effecting micro-op may additionally be issued as the first micro-op of a four micro-op sequence. The last micro-op in such a micro-op sequence will hereinafter be referred to as a pseudo branch effecting micro-op. A particular example is the issuance of a near call macro instruction of the Intel Architecture as four micro-op with the branch effecting micro-op as the first micro-op. The near call macro instruction of the Intel Architecture is a branch instruction that branch to a memory location within the current code segment. As will be described in further detail below, additional circuitry is provided to accommodate the variation in the placement of the branch effecting micro-op in a micro-op sequence. Based on these and other descriptions to follow, it will be appreciated that the present invention can be practiced with the branch effecting micro-op being placed anywhere in a micro-op sequence independent of the number of micro-ops being considered for retirement in each retirement operation, provided additional corresponding detection circuitry are included. Since these additional variations of detection circuitry are numerous and well within the ability of those skilled in the art, they will not be individually described.

The instruction fetch and micro-op issue circuit 32 transfers the in-order sequence of logical micro-ops and corresponding macro instruction pointer delta values and flow markers to the register alias circuit 34 and the allocator circuit 36 over a logical micro-op bus 50. For one embodiment, the instruction fetch and micro-op issue circuit 32 issues up to four in-order logical micro-ops during each clock cycle of the processor 22. Alternatively, the instruction fetch and micro-op issue circuit 32 issues up to three in-order logical micro-ops during each clock cycle of the processor 22 in order to reduce the integrated circuit die space for implementing the processor 22 and the cache circuit 24.

Each logical micro-op on the logical micro-op bus 50 comprises an op code, a pair of logical sources and a logical destination, and a set of flow markers. In one embodiment where the macro instructions are variable in size, each logical micro-op further comprises a macro instruction pointer delta value. Each logical source may specify a register or provide an immediate data value. The register logical sources and the logical destinations of the logical micro-ops specify architectural registers of the original macro instructions.

The instruction fetch and micro-op issue circuit 32 generates the macro instruction pointer delta value for a logical micro-op to indicates the length in bytes of the corresponding macro instruction. For example, each logical micro-op of a four byte macro instruction has a macro instruction pointer delta value equal to four.

The instruction fetch and micro-op issue circuit 32 generates the flow markers to indicate the boundaries of macro instructions. The flow markers include a beginning of macro instruction (BOM) flow marker, and an end of macro instruction (EOM) flow marker. The BOM flow marker indicates that the corresponding logical micro-op is the first logical micro-op of a macro instruction, and the EOM marker indicates that the corresponding logical micro-op is the last logical micro-op of the macro instruction. If a macro instruction maps to only one logical micro-op, then that logical micro-op carries both the BOM and the EOM flow markers.

The register alias circuit 34 receives the in-order logical micro-ops over the logical micro-op bus 50, and generates a corresponding set of in-order physical micro-ops by renaming the logical sources and logical destinations of the logical micro-ops. The register alias circuit 34 receives the in-order logical micro-ops over the logical micro-op bus 50, maps the register logical sources and the register logical destination of each logical micro-op into physical sources and a physical destination, and transfers the in-order physical micro-ops, along with corresponding macro instruction pointer delta values and flow markers over a physical micro-op bus 52.

Each physical micro-op comprises the opcode of the corresponding logical micro-op, a pair of physical sources, and a physical destination. Each physical source may specify a physical register or provide an immediate data value. The register physical sources of the physical micro-ops specify physical registers contained in the reorder circuit 42 and committed state registers contained in the real register circuit 44. The physical destinations of the physical micro-ops specify physical registers contained in the reorder circuit 42.

The register alias circuit 34 transfers the logical destinations, macro instruction pointer delta values, and flow markers of the logical micro-ops over a logical destination bus 54. The logical destinations on the logical destination bus 54 identify the architectural registers that correspond to the physical destinations on the physical micro-op bus 52.

The allocator circuit 36 tracks the available resources in the reorder circuit 42, the reservation and dispatch circuit 38, and the execution circuit 40. The allocator circuit 36 assigns physical destinations in the reorder circuit 42 and reservation station entries in the reservation and dispatch circuit 38 to the physical micro-ops on the physical micro-op bus 52.

The allocator circuit 36 transfers the assigned physical destinations to the register alias circuit 34 over a physical destination bus 56. The allocated physical destinations specify physical registers in the reorder circuit 42 for buffering speculative results for the physical micro-ops. The allocated physical destinations are used by the register alias circuit 34 to rename the logical destinations of the logical micro-ops to physical destinations.

The allocator circuit 36 assigns the physical registers of the reorder circuit 42 to the physical micro-ops in the same order that logical micro-ops are received over the logical micro-op bus 50. The allocator circuit 36 maintains an allocation pointer for allocating physical registers of the reorder circuit 42. The ordering of the physical registers assigned to the physical micro-ops in the reorder circuit 42 reflects the ordering of the original logical micro-ops.

The reservation and dispatch circuit 38 buffers the physical micro-ops awaiting execution by the execution circuit 40. The reservation and dispatch circuit 38 receives the physical micro-ops over the physical micro-op bus 50 and stores the physical micro-ops in available reservation station entries. The reservation and dispatch circuit 38 assembles source data for the physical micro-ops, and dispatches the physical micro-ops to appropriate execution units in the execution circuit 40 when the source data is assembled.

The reorder circuit 42 contains the physical registers that buffer speculative results for the physical micro-ops. The physical registers of the reorder circuit 42 buffer integer and floating-point speculative result data.

The real register circuit 44 contains committed state registers that correspond to the architectural registers of the original stream of macro-instructions. The real register circuit 44 also contains a committed state register for the instruction pointer of the processor 22.

For one embodiment, the committed state registers of the real register circuit 44 comprise the EAX, EBX, ECX, and EDX registers, etc. and architectural flags, as well as the EIP instruction pointer register of the Intel Architecture Microprocessor.

The reorder circuit 42 and the real register circuit 44 receive the physical micro-ops over the physical micro-op bus 52. The physical sources of the physical micro-ops specify physical registers in the reorder circuit 42 and committed state registers in the real register file 44 that hold the source data for the physical micro-ops.

The reorder circuit 42 and the real register circuit 44 read the source data specified by the physical sources, and transfer the source data to the reservation and dispatch circuit 38 over a source data bus 58. Each physical source on the physical micro-op bus 52 includes a real register file valid (rrfv) flag that indicates whether the corresponding source data is contained in a physical register in the reorder circuit 42 or a committed state register in the real register file 44.

The physical destinations of the physical micro-ops on the physical micro-op bus 52 specify physical registers in the reorder circuit 42 for buffering the speculative results of the out of order execution of the physical micro-ops. The reorder circuit 42 receives the physical destinations of the physical micro-ops over the physical micro-op bus 52, and clears the physical registers specified by the physical destinations.

The reorder circuit 42 receives the logical destinations and flow markers corresponding to the physical micro-ops over the logical destination bus 54, and stores the logical destinations and flow markers into the physical registers specified by the physical destinations of the physical micro-ops.

The reservation and dispatch circuit 38 receives the source data for the pending physical micro-ops from the reorder circuit 42 and the real register circuit 44 over the source data bus 58. The reservation and dispatch circuit 38 also receives source data for the pending physical micro-ops from the execution circuit 40 over a result bus 62 during a write back of speculative results from the execution circuit 40 to the reorder circuit 42.

The reservation and dispatch circuit 38 schedules the physical micro-ops having completely assembled source data for execution. The reservation and dispatch circuit 38 dispatches the ready physical micro-ops to the execution circuit 40 over a micro-op dispatch bus 60. The reservation and dispatch circuit 38 schedules execution of physical micro-ops out of order according to the availability of the source data for the physical micro-ops, and according to the availability of execution unit resources in the execution circuit 40.

The execution circuit 40 writes back the speculative results from the out of order execution of the physical micro-ops to the reorder circuit 42 over the result bus 62. The writes back of speculative results by the execution circuit 40 is out of order due to the out of order dispatching of physical micro-ops by the reservation and dispatch circuit 38 and the differing number of processor 22 cycles required for execution of the differing types of physical micro-ops. Since in the preferred embodiment, the branch effective micro-op is always generated as the last micro-op of the micro-op sequence of the branch macro instruction, the target address of the branch macro instruction is always written back as result data of the last micro-op.

However, in the alternate embodiment where the branch effective micro-op may be generated as the first micro-op of the micro-op sequence of the branch macro instruction, the target address of the branch macro instruction may also be written back as result data of the first micro-op.

For one embodiment, the execution circuit 40 comprises a set of five execution units, and the reservation and dispatch circuit 38 dispatches up to five physical micro-ops concurrently to the execution circuit 40 over the micro-op dispatch bus 60.

The execution circuit 40 contains an address generation unit that executes physical micro-ops targeted for a code segment base register and an instruction pointer limit register for the processor 22. The execution circuit 40 generates instruction pointer limit values by executing physical micro-ops that load the instruction pointer limit register, and then transfers the instruction pointer limit values to the retire circuit 46 over a control register bus 72.

The retire circuit 46 contains the instruction pointer limit register. The retire circuit 46 receives the instruction pointer limit values over the control register bus 72, and stores the instruction pointer limit values in the instruction pointer limit register.

The speculative results held in the physical registers of the reorder circuit 42 are committed to an architectural state in the same order as the original logical micro-ops were received. During a retirement operation, the reorder circuit 42 transfers the speculative results of the physical registers of the reorder circuit 42 to the corresponding committed state registers of the real register circuit 44 over a retirement bus 64.

The retirement operations are controlled by the retire circuit 46. The retire circuit 46 signals a retirement operation by transferring a retirement pointer over a retire notification bus 70. The retirement pointer specifies a set of physical registers in the reorder circuit 42 for the retirement operation. For one embodiment, the retire circuit 46 retires up to four physical registers during each cycle of the processor 22. For another embodiment that minimizes integrated circuit die space required to implement the processor 22 and the cache circuit 24, the retire circuit 46 retires up to three physical registers during each cycle of the processor 22.

The reorder circuit 42 receives the retirement pointer over the retire notification bus 70, and reads the set of physical registers specified by the retirement pointer. The reorder circuit 42 then transfers the speculative result data from the retiring physical destinations to the real register circuit 44 over the retirement bus 64. The reorder circuit 42 also transfers macro instruction pointer delta values, flow markers and result data values from the retiring physical destinations to the retire circuit 46 over a retire control bus 170.

The retire circuit 46 receives macro instruction pointer delta values and flow markers from the retiring physical destinations over the retire control bus 170, and receives a current macro instruction pointer value from the real register circuit 44 over an instruction pointer bus 162. The retire circuit 46 determines two or more speculative new macro instruction pointer values for each of the retiring physical micro-ops and determines whether any of the retiring physical micro-ops cause an instruction pointer limit violation.

The number of speculative new macro instruction pointer values determined for a retiring physical micro-op is dependent on its relative position to the other physical micro-ops also being considered for retirement. More specifically, two, three, four, and five speculative new macro instruction pointers are determined for the first, second, third, and fourth physical micro-ops being considered for retirement.

The retire circuit 46 conditionally writes a new macro instruction pointer value to the real register circuit 44 over the instruction pointer bus 162, using one of the determined speculative new macro instruction pointer values, depending on how many, if any, of the physical micro-ops can actually retire. As will be described in more detail below, a physical micro-op is not allowed to retire if one or more of the speculative new macro instruction pointer values calculated on its behalf violate the instruction pointer limit. If an instruction pointer limit violation is detected, the retire circuit 44 writes the fault information into the architectural fault registers of the real register circuit 44 instead.

The register alias circuit 34 and the allocator circuit 36 receive the retirement pointer over the retire notification bus 70. The register alias circuit 34 accordingly updates the register alias table to reflect the retirement. The allocator circuit 36 marks the retired physical registers in the reorder circuit 42 as available for allocation.

Figure 3:
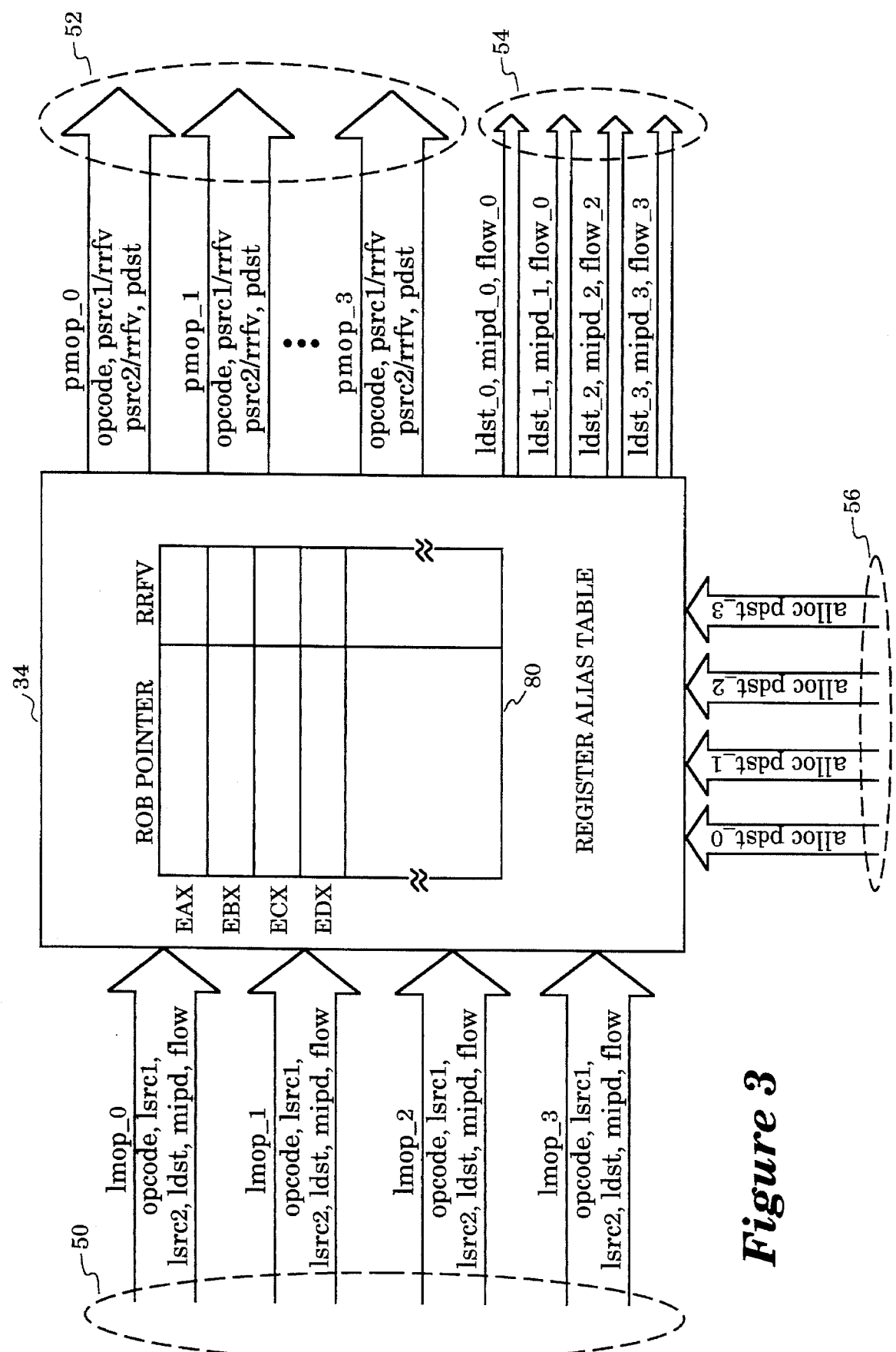
FIG. 3 is a diagram that illustrates the functions of the register alias circuit which implements a register alias table for logical to physical register renaming.

FIG. 3 is a diagram that illustrates the functions of the register alias circuit 34. The register alias circuit 34 implements a register alias table 80. The register alias table 80 enables logical to physical register renaming by mapping the logical sources and destinations to the physical sources and destinations. The physical sources and destinations of the physical micro-ops specify physical registers in the reorder circuit 42 and committed state registers in the real register circuit 44.

The entries in the register alias table 80 correspond to the architectural registers of the original macro instruction stream. For one embodiment, the EAX, EBX, ECX, and EDX entries of the register alias table 80 correspond to the EAX, EBX, ECX, and EDX registers of the Intel Architecture Microprocessor.

Each entry in the register alias table 80 stores a reorder buffer (ROB) pointer. The ROB pointer specifies a physical register in the reorder circuit 42 that holds the speculative result data for the corresponding architectural register. Each entry in the register alias table 80 also stores a real register file valid (rrfv) flag that indicates whether the speculative result data for the corresponding architectural register has been retired to the appropriate committed state register in the real register circuit 44.

The register alias circuit receives the in order logical micro-ops (Imop_0 through Imop_3) over the logical micro-op bus 50. Each logical micro-op comprises an op code, a pair of logical sources (lsrc1 and lsrc2), a logical destination (ldst), a macro instruction pointer delta value (mipd), and a set of flow markers (flow). The logical sources lsrc1 and lsrc2 and the logical destination ldst each specifies an architectural register of the original stream of macro-instructions.

The register alias circuit 34 also receives a set of allocated physical destinations (alloc_pdst_0 through alloc_pdst_3) from the allocator circuit 36 over the physical destination bus 56. The physical destinations alloc_pdst_0 through alloc_pdst_3 specify newly allocated physical registers in the reorder circuit 42 for the logical micro-ops Imop_0 through Imop_3. The physical registers in the reorder circuit 42 specified by the physical destinations alloc_pdst_0 through alloc_pdst_3 will hold speculative result data for the physical micro-ops corresponding to the logical micro-ops Imop_0 through Imop_3.

The register alias circuit 34 transfers a set of in order physical micro-ops (pmop_0 through pmop_3) over the physical micro-op bus 52. Each physical micro-op comprises an op code, a pair of physical sources (psrc1 and psrc2) and a physical destination (pdst). The physical sources psrc1 and psrc2 each specify a physical register in the reorder circuit 42 or a committed state register in the real register circuit 44. The physical destination pdst specifies a physical register in the reorder circuit 42 to hold speculative result data for the corresponding physical micro-op.

The register alias circuit 34 generates the physical micro-ops pmop_0 through pmop_3 by mapping the logical sources of the logical micro-ops Imop_0 through Imop_3 to the physical registers of the reorder circuit 42 and the committed state registers specified of the real register circuit 44 as specified by the register alias table 80. The register alias circuit 34 merges the physical destinations alloc_pdst_0 through alloc_pdst_3 into the physical destination pdst of the physical micro-ops pmop_0 through pmop_3.

For example, the register alias circuit 34 generates the physical source psrc1 for the physical micro-op pmop_0 by reading the register alias table 80 entry specified by the logical source lsrc1 of the Imop_0. If the rrfv flag of the specified register alias table 80 entry is not set, then the register alias circuit 34 transfers the ROB pointer from the specified register alias table 80 entry along with the rrfv flag over the physical micro-op bus 52 as the physical source psrc1 for the pmop_0. If the rrfv bit is set, then the register alias circuit 34 transfers a pointer to the committed state register in the real register circuit 44 that corresponds to the logical source lsrc1 along with the rrfv flag over the physical micro-op bus 52 as the physical source psrc1 for the pmop_0.

The register alias circuit 34 generates the physical source psrc2 for the physical micro-op pmop_0 by reading the register alias table 80 entry that corresponds to the logical source lsrc2 of the Imop_0. If the rrfv flag is not set, then the register alias circuit 34 transfers the ROB pointer from the specified register alias table 80 entry along with the rrfv flag over the physical micro-op bus 52 as the physical source psrc2 for the pmop_0. If the rrfv bit is set, then the register alias circuit 34 transfers a pointer to the committed state register in the real register circuit 44 that corresponds to the logical source lsrc2 along with the rrfv flag over the physical micro-op bus 52 as the physical source psrc2 for the pmop_0.

The register alias circuit 34 stores the physical destination alloc_pdst_0 into the ROB pointer field of the register alias table 80 entry specified by the logical destination ldst of the Imop_0, and clears the corresponding rrfv bit. The cleared rrfv bit indicates that the current state of the corresponding architectural register is speculatively held in the physical register of the reorder circuit 42 specified by the corresponding ROB pointer.

The register alias circuit 34 transfers a set of logical destinations (ldst_0 through ldst_3) and corresponding macro instruction pointer delta values (mipd_0 through mipd_3) and flow markers (flow_0 through flow_3) over the logical destination bus 54. The logical destinations ldst_0 through ldst_3 are the logical destinations ldst of the logical micro-ops Imop_0 through Imop_3. The macro instruction pointer delta values mipd_0 through mipd_3 are the macro instruction pointer delta values mipd of the logical micro-ops Imop_0 through Imop_3. The macro instruction pointer delta values mipd_0 through mipd_3 indicate the byte length of the original macro instructions corresponding to the physical micro-ops pmop_0 through pmop_3.

Figure 4:
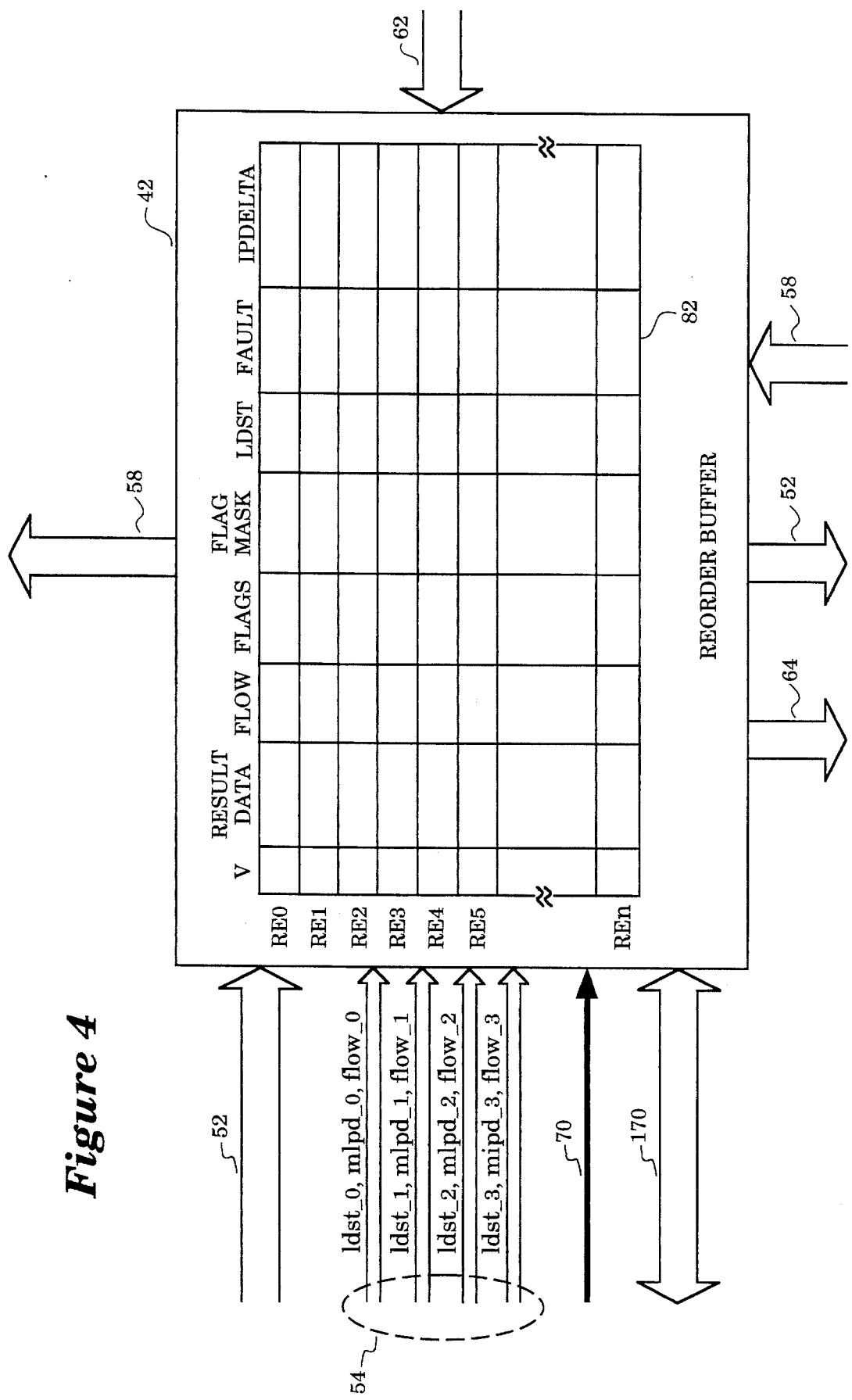
FIG. 4 illustrates the reorder circuit which contains a reorder buffer comprising a set of ROB entries (RE0 through REn) that buffer speculative result data from the out of order speculative execution of physical micro-ops.

FIG. 4 illustrates the reorder circuit 42. The reorder circuit 42 implements a reorder buffer 82 comprising a set of ROB entries (RE0 through REn). The ROB entries RE0 through REn are physical registers that buffer speculative result data from the out of order execution of physical micro-ops. For one embodiment, the ROB entries RE0 through REn comprise a set of 64 physical registers. For another embodiment that minimizes integrated circuit chip area for the processor 22 and the cache circuit 24, the ROB entries RE0 through REn comprise a set of 40 physical registers.

Each ROB entry comprises a valid flag (V), a result data value, a set of flags, a flag mask, a logical destination (LDST), fault data, an instruction pointer delta value (IPDELTA) and a set of flow marker bits (FLOW).

The valid flag indicates whether the result data value for the corresponding ROB entry is valid. The reorder circuit 42 clears the valid flag for each newly allocated ROB entry to indicate an invalid result data value. The reorder circuit 42 sets the valid flag when speculative result data is written back to the ROB entry from the execution circuit 40.

The result data value is a speculative result from the out of order execution of the corresponding physical micro-op. The result data value may be either an integer data value or a floating-point data value. For one embodiment, the result data value field of each ROB entry RE0 through REn comprises 86 bits to accommodate both integer and floating-point data values. If the result data value is a target address of a branch macro instruction, it is stored in the lower 32 bits.

The flags and flag mask provide speculative architectural flag information. The speculative architectural flag information is transferred to the architectural flags of the real register circuit 44 upon retirement of the corresponding ROB entry.

The logical destination LDST specifies a committed state register in the real register circuit 44. The result data value of the corresponding ROB entry is transferred to the committed state register specified by LDST during retirement of the ROB entry.

The fault data contains fault information for the corresponding ROB entry. The fault data includes a branch result flag indicating whether the corresponding ROB entry stores speculative result data from execution of a branch micro-op.

The IPDELTA is a macro instruction pointer delta value that indicates the byte length of the macro instruction that generated the physical micro-op allocated to the corresponding ROB entry.

The reorder circuit 42 receives the physical micro-ops pmop__0 through pmop__3 over the physical micro-op bus 52. The reorder circuit 42 reads the source data specified by the physical micro-ops pmop__0 through pmop__3 from the reorder buffer 82. The reorder circuit 42 transfers the result data values and the valid flags from the ROB entries specified by the physical sources psrc1 and psrc2 of the physical micro-ops to the reservation and dispatch circuit 38 over the source data bus 58.

The reorder circuit 42 clears the valid bits of the ROB entries specified by the physical destinations pdst the physical micro-ops pmop__0 through pmop__3 received over the physical micro-op bus 52. The reorder circuit 42 clears the valid bits to indicate that the corresponding result data value is not valid until the execution circuit 40 writes back results for the physical micro-ops pmop__0 through pmop__3.

The reorder circuit 42 receives the logical destinations ldst__0 through ldst__3, the macro instruction pointer delta values mipd__0 through mipd__3, and the flow markers flow__0 through flow__3 over the logical destination bus 54. The reorder circuit 42 stores the logical destinations ldst__0 through ldst__3 into the LDST fields of the ROB entries specified by the physical destinations pdst the physical micro-ops pmop__0 through pmop__3. The reorder circuit 42 stores the macro instruction pointer delta values mipd__0 through mipd__3 into the IPDELTA fields of the ROB entries specified by the physical destinations pdst the physical micro-ops pmop__0 through pmop__3. The reorder circuit 42 stores the flow markers flow__0 through flow__3 into the FLOW fields of the ROB entries specified by the physical destinations pdst the physical micro-ops pmop__0 through pmop__3.

For example, the reorder circuit 42 stores the ldst__0, the mipd__0, and the flow__0 into the LDST, the IPDELTA, and the FLOW fields of the ROB entry specified by the physical destination pdst of the pmop__0. The logical destination in the LDST field of a ROB entry specifies a committed state register in the real register circuit 44 for retirement of the corresponding ROB entry.

The reorder circuit 42 receives write back speculative result information from the execution circuit 40 over the result bus 62. The write back speculative result information from the execution circuit 40 comprises result data values, physical destinations pdst and fault data.

The reorder circuit 42 stores the write back speculative result information from the execution circuit 40 into the ROB entries specified by the physical destinations pdst on the result bus 62. The reorder circuit 42 stores the result data value into the result data value field, and stores the fault data into the fault data field of the ROB entry specified by the physical destination pdst.

Each result data value from the executions circuit 40 includes a valid flag. Each valid flag is stored in the valid flag field of the ROB entry specified by the physical destination pdst. The valid flags of a ROB entry indicates whether the corresponding result data value is valid.

The reorder circuit 42 receives the retirement physical destinations over the retire notification bus 70. The retirement physical destinations cause the reorder circuit 42 to commit the speculative result data values in the ROB entries RE0 through REn to architectural state by transferring the speculative result data values to the real register circuit 44 over the retirement bus 64.

The reorder circuit 42 reads the ROB entries specified by the retirement pointer on the retire notification bus 70 during a retirement operation. The reorder circuit 42 then transfers a set of retiring micro-ops (rm__0 through rm__4) to the real register circuit 44 over the retirement bus 64. Each retiring micro-op rm__0 through rm__4 comprises a result data value and a logical destination ldst from one of the retiring ROB entries specified by the retirement pointer.

The reorder circuit 42 also transfers the lower 32 bits of the result data values, the macro instruction pointer delta values, and the flow markers for the retiring ROB entries to the retire circuit 46 over the retire control bus 170.

Figure 5:
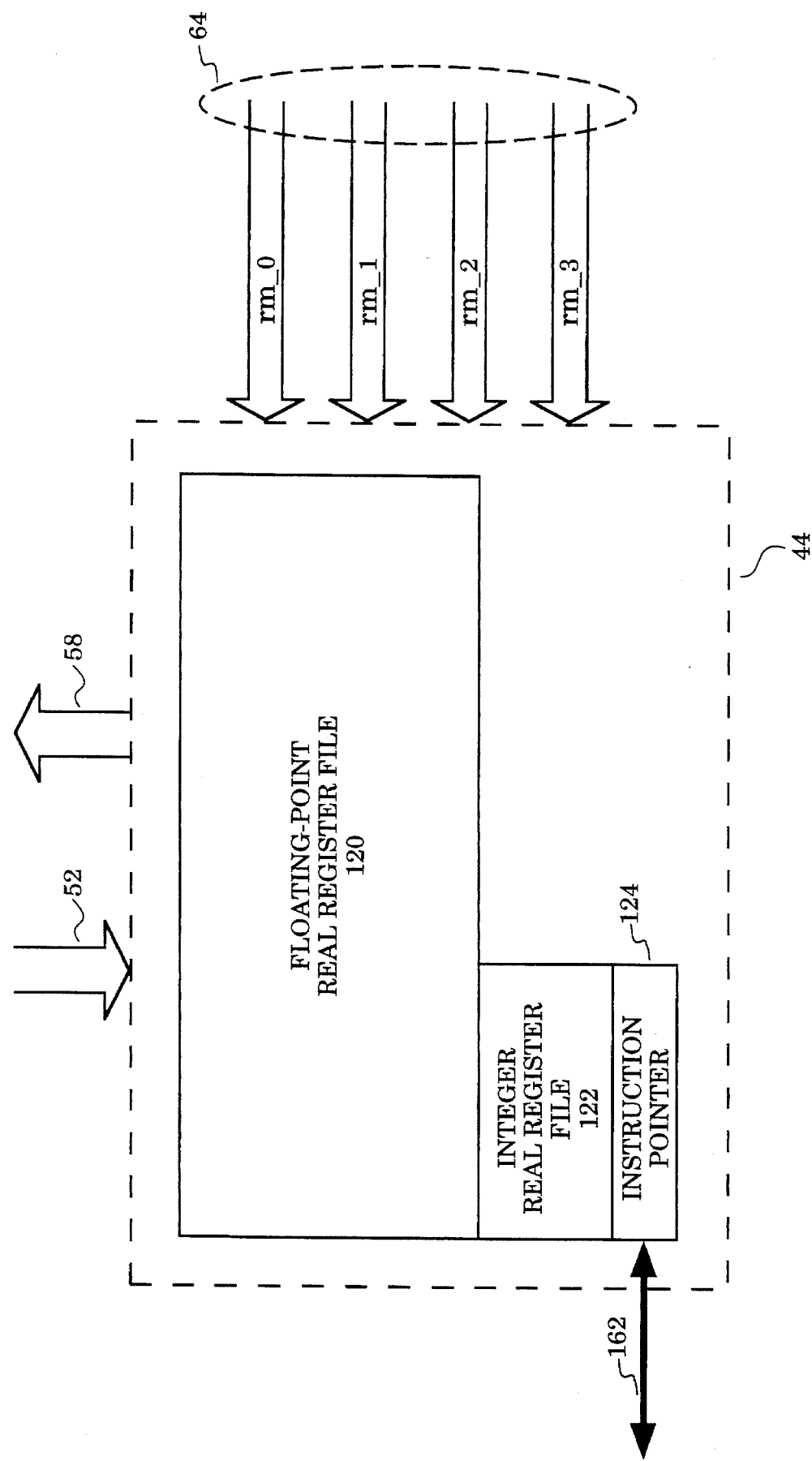
FIG. 5 illustrates the real register circuit which implements a set of committed state registers that hold committed result data values in a floating-point register file and an integer real register file.

FIG. 5 illustrates the real register circuit 44. The real register circuit 44 implements a set of committed state registers that hold committed result data values. The committed state registers in real register circuit 44 are arranged as a floating-point register file 120 and an integer real register file 122. The committed state registers buffer committed results for the architectural registers of the original stream of macro instructions.

The real register circuit 44 also contains a macro instruction pointer register 124. The macro instruction pointer register 124 stores the committed state of the macro instruction pointer for the processor 22. The macro instruction pointer register 124 is accessed by the retire circuit 46 over the macro instruction pointer bus 162.

The retire circuit 46 reads from the macro instruction pointer register 124, updates the macro instruction pointer value according to the retirement of a set of physical micro-ops and then transfers a new macro instruction pointer value to the macro instruction pointer register 124 over the instruction pointer bus 162.

The real register circuit 44 receives the physical micro-ops pmop__0 through pmop__3 over the physical micro-op bus 52. The real register circuit 44 reads the result data values from the committed state registers specified by the physical sources psrc1 and psrc2 of the physical micro-ops pmop_0 through pmop_3 from the real register files 120 and 122 if the rrfv flags indicate that the physical sources are retired. The real register circuit 44 then transfers the result data values from the specified committed state registers to the reservation and dispatch circuit 38 over the source data bus 58. The real register circuit 44 always sets the source data valid flags while transferring source data to the reservation and dispatch circuit 38 over the source data bus 58 because the result data in the committed state registers is always valid.

The real register circuit 44 receives the retiring micro-ops rm_0 through rm_3 from the reorder circuit 42 over the retirement bus 64. Each retirement micro-op rm_0 through rm_3 contains speculative results from the retiring ROB entries in the reorder buffer 82.

Each retirement micro-op rm_0 through rm_3 comprises a result data value and a logical destination ldst. The real register circuit 44 stores the result data values of the retirement micro-ops rm_0 through rm_3 into the committed state registers of the real register file 86 specified by the logical destinations ldst the retirement micro-op rm_0 through rm_3.

Figure 6:
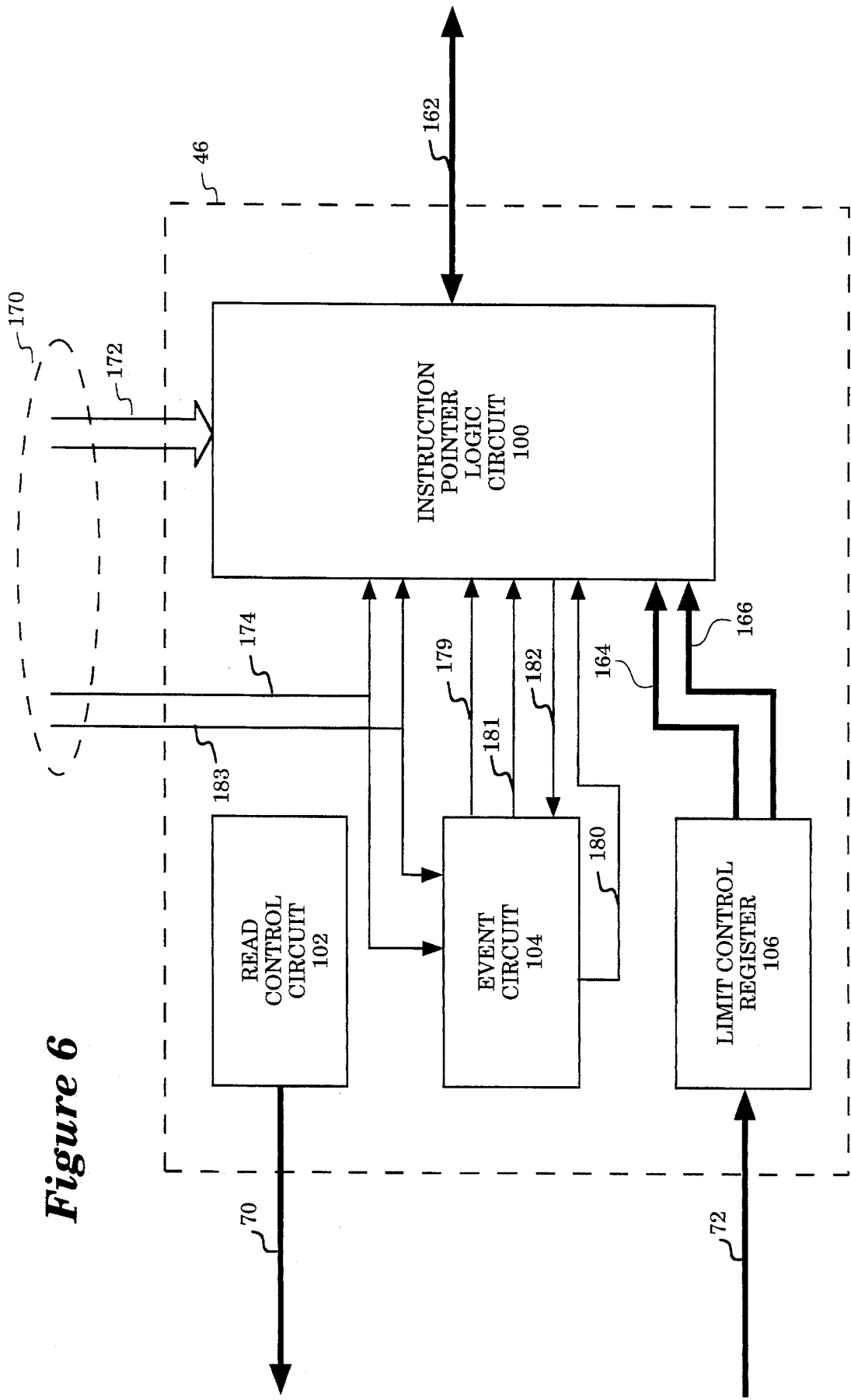
FIG. 6 illustrates the retire circuit which comprises a read control circuit, an event circuit, a limit control register, and an instruction pointer logic circuit.

FIG. 6 illustrates the retire circuit 46. The retire circuit 46 comprises a read control circuit 102, an event circuit 104, a limit control register 106, and an instruction pointer logic circuit 100.

The read control circuit 102 transfers a retirement pointer over the retire notification bus 70. The retirement pointer specifies a set of sequential ROB entries for a retirement operation. For one embodiment, the retirement pointer on the retire notification bus 70 specifies a set of four sequential ROB entries as retiring micro-ops during each clock cycle of the processor 22 and the cache circuit 24. For another embodiment that reduces integrated circuit chip area for the processor 22, the retirement pointer on the retire notification bus 70 specifies a set of three sequential ROB entries as retiring micro-ops during each clock cycle of the processor 22.

The limit control register 106 stores an instruction pointer limit value for the processor 22. The limit control register 106 receives updated instruction pointer limit values over the control register bus 72 from the address generation unit in the execution circuit 40. The limit control register 106 transfers a stored instruction pointer limit (IPL) value and a stored instruction pointer limit plus one (IPL+1) value to the instruction pointer logic circuit 100 over signal lines 164 and 166, respectively. The instruction pointer logic circuit 100 uses the IPL and IPL+1 values to detect instruction pointer limit violations.

The instruction pointer logic circuit 100 determines two or more speculative macro instruction pointer values for each retiring micro-op during each retirement operation. The instruction pointer logic circuit 100 factors into consideration potential duplicate contributions in advancing the next macro instruction pointer, and placement of branch effecting micro-ops in micro-op sequences. Each of the speculative macro next instruction pointers indicates what the next macro instruction pointer for the processor should be for retiring a particular combination of the result data values of the physical micro-ops under consideration. The instruction pointer logic circuit 100 receives the lower 32 bits of a result data value and an instruction pointer delta value for each of the retiring ROB entries over a portion 172 of the retirement bus 170. The instruction pointer logic circuit 100 also receives a flow marker 174 and a branch flag 183 from the fault data field for each of the retiring ROB entries over the retirement bus 170. Additionally, the instruction pointer circuit 100 receives a number of signals 179, 180, and 181 from the event circuit 104, which will be described in further detail below. Furthermore, the instruction pointer logic circuit 100 receives a current instruction pointer value from the instruction pointer register 124 of the real register circuit 44 over the instruction pointer bus 162. The instruction pointer logic circuit 100 determines the speculative new macro instruction pointer values using these inputs.

The instruction pointer logic circuit 100 also determines whether the retiring micro-ops cause instruction pointer limit violations by comparing the various speculative new macro instruction pointer values for each retiring micro-op against either IPL or IPL+1. The instruction pointer logic circuit 100 generates a set of limit violation signals 182 that indicate which, if any, of the speculative new macro instruction pointer values of the retiring micro-ops causes an instruction pointer limit violation. The limit violation signals 182 comprise a limit violation signal for each of the speculative new macro instruction pointer values of the retiring micro-ops.

The instruction pointer logic circuit 100 then conditionally updates the next macro instruction pointer with one of the speculative next macro instruction pointers, depending on how many, if any, of the physical micro-ops can retire, and whether any of the retiring micro-ops are branch effecting micro-ops, factoring into consideration placement of branch effecting micro-ops in micro-op sequences.

The event circuit 104 receives the flow markers 174 and branch flags 183 from the fault data fields for the retiring ROB entries over the retirement bus 170. The flow marker 174 for each retiring micro-op may include either a BOM marker or an EOM marker or both. The event circuit 104 also receives the limit violation signals 182 from the instruction pointer logic circuit 100.

For each retiring micro-op having a BOM marker, the event circuit 104 tests the corresponding limit violation signals 182 for instruction pointer limit violations. The event circuit 104 then generates a set of guarantee signals 180 for the instruction pointer logic circuit 100. The guarantee signals 180 indicate which of the physical micro-ops under consideration can retire. The event circuit 104 generates the guarantee signals 180 such that retiring micro-ops that cause a code segment violation cannot retire.

Additionally, the event circuit 104 generates a fault signal (not shown) denoting the detection of code segment violation for an exception handling circuit (not shown), thereby causing the exception handling circuit to handle the code segment violation. Code segment violation may be handled in a number of application dependent manners including but not limited to the clearing of all reorder buffer entries in the reorder circuit 42.

Furthermore, for an embodiment where a branch effecting micro-op may be generated as a non-micro-op-sequence-terminating micro-op of a micro-op sequence, the event circuit 104 further tests the flow markers 174 and the branch flags 183 for non-EOM marked branch effecting micro-ops and the corresponding EOM marked pseudo branch effecting micro-ops, and accordingly generates two sets of non-EOM branch signals 179 and 181 denoting the detections of the respective events. The first set of non-EOM branch signals 179 identify which one, if any, of the retiring physical micro-ops is a non-EOM marked branch effecting micro-op. The second set of non-EOM branch signals 181 identify the corresponding EOM marked pseudo branch effecting micro-op. The two sets of non-EOM branch signals are provided to the instruction pointer logic circuit 100.

Figure 7:
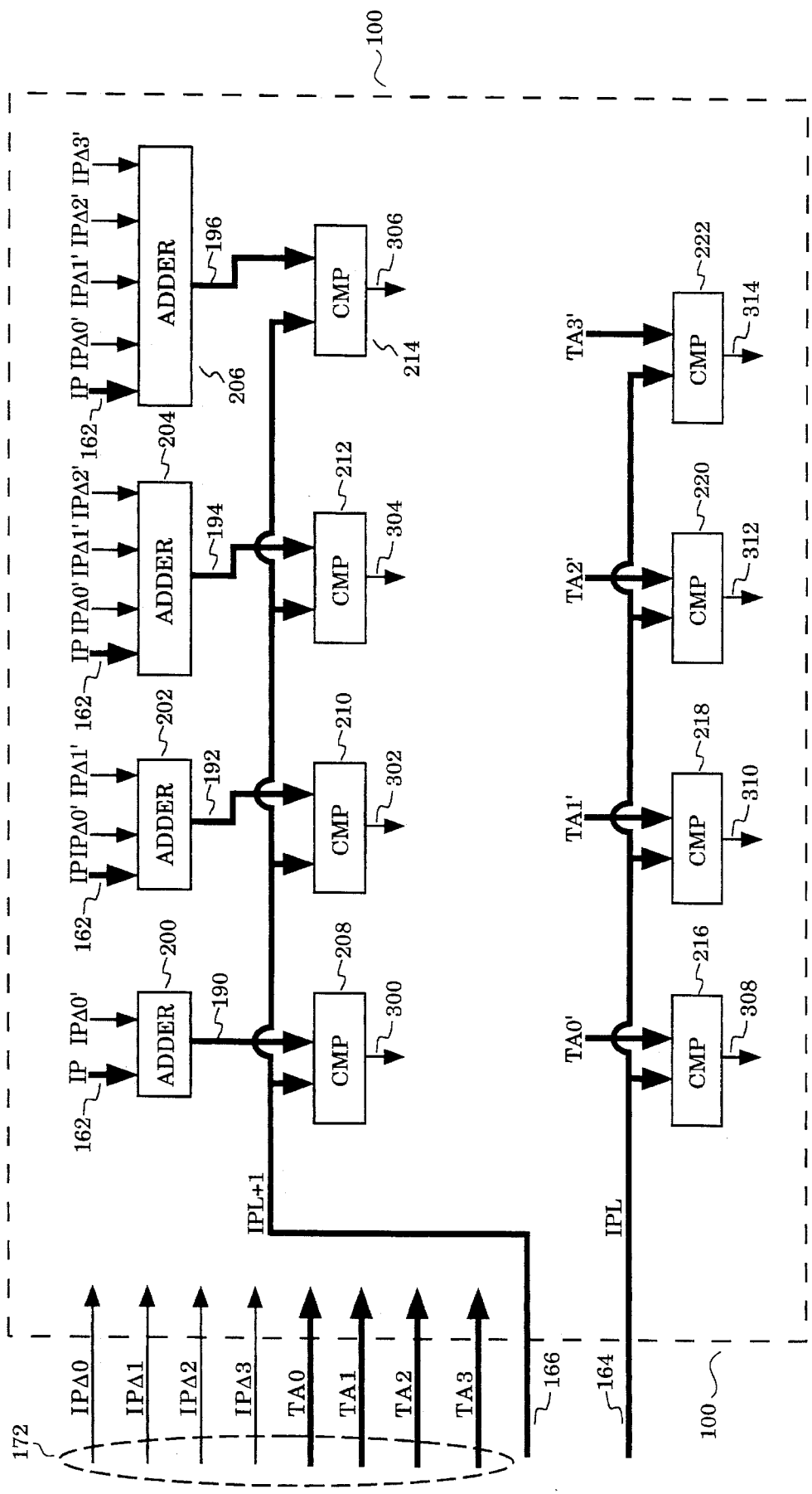
FIG. 7 illustrates circuitry in the instruction pointer logic circuit that determines the speculative new macro instruction pointers for the retiring micro-ops and whether they cause one or more instruction pointer limit violations.

FIG. 7 illustrates circuitry in the instruction pointer logic circuit 100 that determines the speculative new macro instruction pointer values for the retiring micro-ops, and detects whether these values cause instruction pointer limit violations. The instruction pointer logic circuit 100 receives the IPL value 164 and the IPL+1 value 166 from the limit control register 106. The instruction pointer logic circuit 100 receives the current instruction pointer value IP from the instruction pointer register 124 over the instruction pointer bus 162.

The instruction pointer logic circuit 100 receives a set of instruction pointer delta values IPΔ0–IPΔ3 from the reorder circuit 42, and a set of target address values TA0–TA3 from the reorder circuit 42. The instruction pointer delta values IPΔ0–IPΔ3 and target address values TA0–TA3 correspond to the ROB entries for the retiring micro ops rm_0 through rm_3. The target address values TA0–TA3 correspond to the lower 32 bits of each result data field of the retiring ROB entries whether or not the corresponding retiring micro-ops are branch instructions.

IPΔ0'–IPΔ3' are generated correspondingly from the IPΔ0–IPΔ3, factoring into consideration whether they are duplicate contributions in advancing the next macro instruction pointer. The generation of IPΔ0'–IPΔ3' will be described in further detail below. Based on the description to follow, it will be appreciated that for an embodiment where the macro instructions are not converted into one or more micro-ops, IPΔ0'–IPΔ3' are simply IPΔ0–IPΔ3 without modification.

TA0'–TA3' are generated correspondingly from the TA0–TA3, factoring into consideration placement of branch effecting micro-ops in micro-op sequences. The generation of TA0'–TA3' will be described in further detail below. Based on the description to follow, it will be appreciated that for an embodiment where the macro instructions are not converted into one or more micro-ops, or for an embodiment where branch effecting micro-ops are always generated as micro-op-sequence-terminating micro-ops, TA0'–TA3' are simply TA0–TA3 without modification.

An adder circuit 200 and a comparator circuit 208 generate a control signal 300 indicating whether the retiring micro op rm_0 causes a instruction pointer limit violation. The adder circuit 200 generates a sum 190 by adding add the IP to the instruction pointer delta value IPΔ0'. The comparator circuit 208 compares the sum 190 to the IPL+1 value 166. The control signal 300 indicates a instruction pointer limit violation for the retiring micro op rm_0 if the sum 190 is greater than or equal to the IPL+1 value 166.

An adder circuit 202 and a comparator circuit 210 determine whether the retiring micro op rm_1 causes a instruction pointer limit violation. The adder circuit 202 generates a sum 192 of the IP and the instruction pointer delta values IPΔ0' and IPΔ1'. The comparator circuit 210 generates a control signal 302 to indicate a instruction pointer limit violation for the retiring micro op rm_1 if the sum 192 is greater than or equal to the IPL+1 value 166.

An adder circuit 204 and comparator circuit 212 determine whether the retiring micro op rm_2 causes a instruction pointer limit violation. The adder circuit 204 generates a sum 194 by adding the IP to the instruction pointer delta values IPΔ0' through IPΔ2'. The comparator circuit 212 generates a control signal 304 to indicate a instruction pointer limit violation for the retiring micro op rm_2 if the sum 194 is greater than or equal to the IPL+1 value 166.

An adder circuit 206 and a comparator circuit 214 determine whether the retiring micro op rm_3 causes a instruction pointer limit violation. The adder circuit 206 generates a sum 196 by adding the IP to the instruction pointer delta values IPΔ0' through IPΔ3'. The comparator circuit 214 generates a control signal 306 to indicate a instruction pointer limit violation for the retiring micro op rm_3 if the sum 196 is greater than or equal to the IPL+1 value 166.

A set of comparator circuits 216 through 222 determine whether any of the target addresses TA0'–TA3' of the retiring micro-ops rm_0 through rm_3 cause a instruction pointer limit violation. The comparator circuit 216 generates a control signal 308 to indicate a instruction pointer limit violation for the retiring micro op rm_0 if the target address TA0' is greater than or equal to the IPL value 164. The comparator circuit 218 generates a control signal 310 to indicate a instruction pointer limit violation for the retiring micro op rm_1 if the target address TA1' is greater than or equal to the IPL value 164. The comparator circuit 220 generates a control signal 312 to indicate a instruction pointer limit violation for the retiring micro op rm_2 if the target address TA2' is greater than or equal to the IPL value 164. The comparator circuit 222 generates a control signal 314 to indicate a instruction pointer limit violation for the retiring micro op rm_3 if the target address TA3' is greater than or equal to the IPL value 164.

The sums 190–196 are compared to the IPL+1 value 166 while TA0'–TA3' are compared to IPL instead is because a sequentially advanced new macro instruction pointer address, i.e., the sums 190–196, may straddle the instruction pointer limit at the end of a block of code.

As will be described in further detail below, one of the sums 190–196 provides the new macro instruction pointer value if none of the retiring micro-ops rm_0 through rm_3 are branch effecting micro-ops or pseudo branch effecting micro-ops. The sum 190 is selected as the updated instruction pointer value if only the micro-op rm_0 retires according to the guarantee signals 180. The sum 192 is selected as the updated instruction pointer value if only the micro-ops rm._0 and rm_1 retire according to the guarantee signals 180. The sum 194 is selected as the updated instruction pointer value if only the micro-ops rm_0 through rm_2 retire according to the guarantee signals 180. The sum 196 is selected as the updated instruction pointer value if the micro-ops rm_0 through rm_3 retire according to the guarantee signals 180.

However, the target address TA0' provides the new macro instruction pointer value if the retiring micro-ops rm_0 is a branch effecting micro-op or pseudo branch effecting micro-op, and if only the micro-op rm_0 retires. The target address TA1' provides the new macro instruction pointer value if the retiring micro-ops rm_1 is a branch effecting micro-op or pseudo branch effecting micro-op, and if only micro-ops rm_0 through rm_1 retire. The target address TA2' provides the new macro instruction pointer value if the retiring micro-ops rm_2 is a branch effecting micro-op or pseudo branch effecting micro-op, and if only micro-ops rm_0 through rm_2 retire. The target address TA3' provides the new macro instruction pointer value if the retiring micro-ops rm_3 is a branch effecting micro-op or pseudo branch effecting micro-op, and if micro-ops rm_0 through rm_3 retire.

Figure 8:
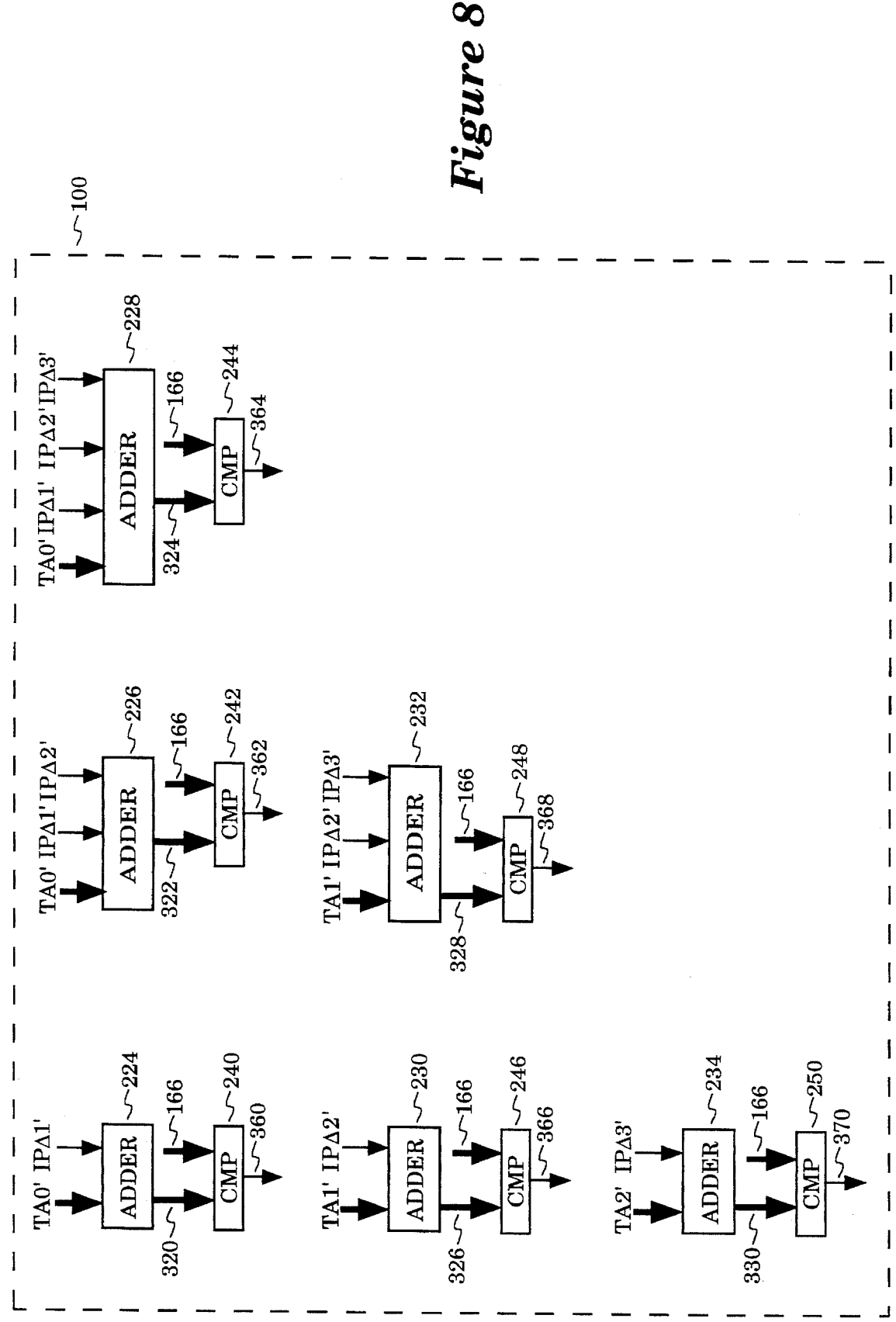
FIG. 8 illustrates additional circuitry in the instruction pointer logic circuit that determines the speculative new macro instruction pointers for the retiring micro-ops and whether they cause one or more instruction pointer limit violations.

FIG. 8 illustrates additional circuitry in the instruction pointer logic circuit 100 that determines the speculative new macro instruction pointer values for the retiring micro-ops, and detects whether these values causes instruction pointer limit violations.

An adder circuit 224 generates a sum 320 by adding the target address TA0' and the IP delta value IPΔ1'. A comparator circuit 240 generates a control signal 360. The control signal 360 indicates an instruction pointer limit violation for the case where the retiring micro-op rm_0 is a branch effecting micro-op or pseudo branch effecting micro-op to the target address TA0' and both micro-ops rm_0 and rm_1 retire, if the sum 320 is greater than or equal to the IPL+1 value 166.

As will be described in further detail below, the sum 320 is selected as the new macro instruction pointer value if the retiring micro-op rm_0 is a branch effecting micro-op or pseudo branch effecting micro-op to the target address TA0' and if only the micro-ops rm_0 and rm_1 retire according to the guarantee signals 180.

An adder circuit 226 generates a sum 322 by adding the target address TA0' and the IP delta values IPΔ1' and IPΔ2'. A comparator circuit 242 generates a control signal 362 indicating an instruction pointer limit violation for the case where the retiring micro-op rm_0 is a branch effecting micro-op or pseudo branch effecting micro-op to the target address TA0' and the micro-ops rm_0 through rm_2 retire, if the sum 322 is greater than or equal to the IPL+1 value 166.

As will be described in further detail below, the sum 322 is selected as the new macro instruction pointer value if the retiring micro-op rm_0 is a branch effecting micro-op or pseudo branch effecting micro-op to the target address TA0' and if only the micro-ops rm_0 through rm_2 retire according to the guarantee signals 180.

An adder circuit 228 generates a sum 324 by adding the target address TA0' and the IP delta values IPΔ1' through IPΔ3'. A comparator circuit 244 generates a control signal 364 indicating an instruction pointer limit violation for the case where the retiring micro-op rm_0 is a branch effecting micro-op or pseudo branch effecting micro-op to the target address TA0' and the micro-ops rm_0 through rm_3 retire, if the sum 324 is greater than or equal to the IPL+1 value 166.

As will be described in further detail below, the sum 324 is selected as the new macro instruction pointer value if the retiring micro-op rm_0 is a branch effecting micro-op or pseudo branch effecting micro-op to the target address TA0' and if the micro-ops rm_0 through rm_3 retire according to the guarantee signals 180.

An adder circuit 230 generates a sum 326 by adding the target address TA1' and the instruction pointer delta value IPΔ2'. A comparator circuit 246 generates a control signal 366 indicating an instruction pointer limit violation for the case where the retiring micro-op rm_1 is a branch effecting micro-op or pseudo branch effecting micro-op to the target address TA1' and the micro-ops rm_0 through rm_2 retire, if the sum 326 is greater than or equal to the IPL+1 value 166.

As will be described in further detail below, the sum 326 is selected as the new macro instruction pointer value if the retiring micro-op rm_1 is a branch effecting micro-op or pseudo branch effecting micro-op to the target address TA1' and if only the micro-ops rm_0 through rm_2 according to the guarantee signals 180.

An adder circuit 232 generates a sum 328 by adding the target address TA1' and the IP delta values IPΔ2' and IPΔ3'. A comparator circuit 248 generates a control signal 368 indicating an instruction pointer limit violation for the case where the retiring micro-op rm_1 is a branch effecting micro-op or pseudo branch effecting micro-op to the target address TA1' and the micro-ops rm_0 through rm_3 retire, if the sum 328 is greater than or equal to the IPL+1 value 166.

As will be described in further detail below, the sum 328 is selected as the new macro instruction pointer value if the retiring micro-op rm_1 is a branch effecting micro-op or pseudo branch effecting micro-op to the target address TA1' and if the micro-ops rm_0 through rm_3 retire according to the guarantee signals 180.

An adder circuit 234 generates a sum 330 by adding the target address TA2' and the instruction pointer delta value IPΔ3'. A comparator circuit 250 generates a control signal 370 an instruction pointer limit violation for the case where the retiring micro-op rm_2 is a branch effecting micro-op or pseudo branch effecting micro-op to the target address TA2' and the micro-ops rm_0 through rm_3 retire, if the sum 330 is greater than or equal to the IPL+1 value 166.

As will be described in further detail below, the sum 330 is selected as the new macro instruction pointer value if the retiring micro-op rm_2 is a branch effecting micro-op or pseudo branch effecting micro-op to the target address TA2' and if the micro-ops rm_0 through rm_3 retire according to the guarantee signals 180.

Figure 9:
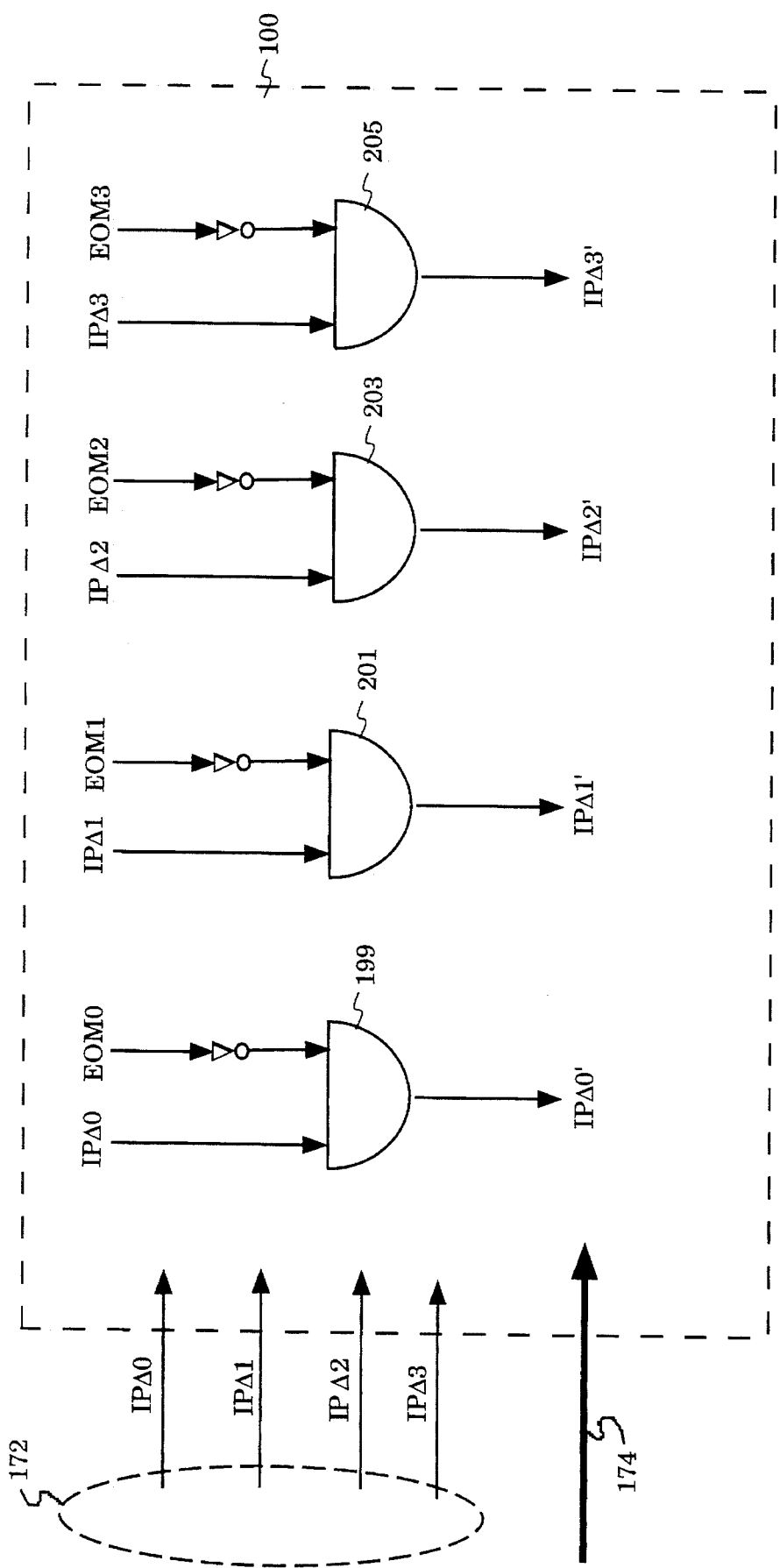
FIG. 9 illustrates circuitry of the instruction pointer logic circuit that zeros out the macro instruction sizes for non-micro-op-sequence-terminating micro-ops.

FIG. 9 illustrates circuitry of the instruction pointer logic circuit 100 for zeroing out the macro instructions' sizes issued with the non-micro-op-sequence-terminating micro-ops. The circuitry is used in embodiments where a macro instruction is converted into one or more micro-ops to eliminate duplicate contributions in advancing the next macro instruction pointer.

An AND gate 199 gates the IPΔ0 value with the inverted EOM0 marker to generate the IPΔ0' value, thereby zeroing out the macro instruction size issued with rm_0 if rm_0 is not the last micro-op of a micro-op sequence.

An AND gate 201 gates the IPΔ1 value with the inverted EOM1 marker to generate the IPΔ1' value, thereby zeroing out the macro instruction size issued with rm_1 if rm_1 is not the last micro-op of a micro-op sequence.

An AND gate 203 gates the IPΔ2 value with the inverted EOM2 marker to generate the IPΔ2' value, thereby zeroing out the macro instruction size issued with rm_2 if rm_2 is not the last micro-op of a micro-op sequence.

An AND gate 205 gates the IPΔ3 value with the inverted EOM3 marker to generate the IPΔ3' value, thereby zeroing out the macro instruction size issued with rm_3 if rm_3 is not the last micro-op of a micro-op sequence.

Figure 10:
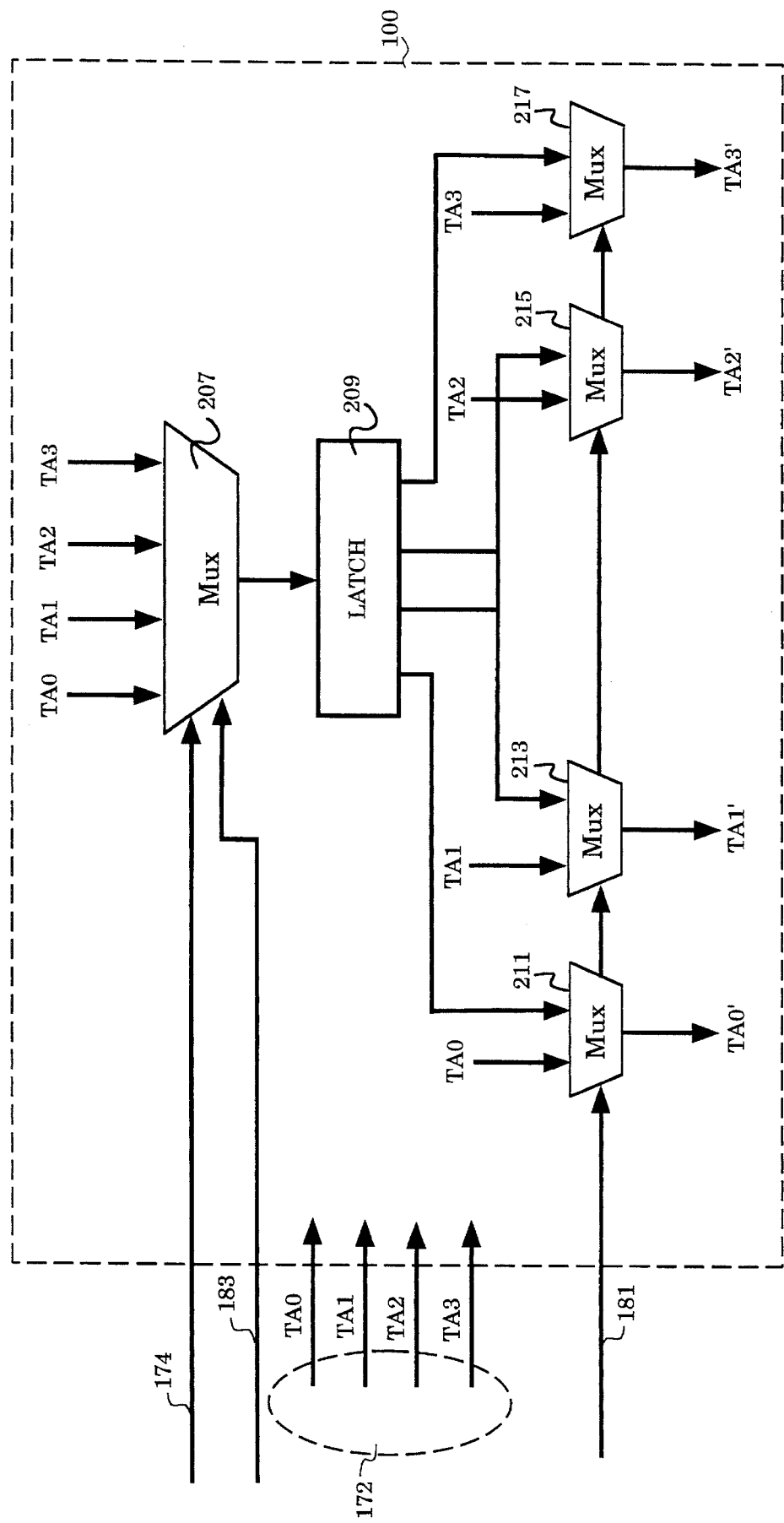
FIG. 10 illustrates circuitry of the instruction pointer logic circuit that saves and makes available the target address of a non-EOM marked branch effecting micro-op.

FIG. 10 illustrates circuitry of the instruction pointer logic circuit 100 for saving and making available the target address of a non-EOM marked branch effecting micro-op. The circuitry is used in embodiments where a branch effecting micro-op is not always issued as the last micro-op of the micro-op sequence to ensure the correct target addresses are substituted for the pseudo branch effecting micro-ops.

A multiplexor 207 and a latch 209 are provided to conditionally store the target address of a retiring micro-op during a retirement operation for a subsequent retirement operation. The conditional storage is performed in response to the first set of non-EOM branch signals 179 generated by the event circuit 104. As described earlier, the first set of non-EOM branch signals 179 identify which one, if any, of the retiring physical micro-ops is a non-EOM marked branch effecting micro-op.

Four additional multiplexors 211–213 are provided to selectively substitute one of the target addresses of the retiring micro-ops of a retirement operation with the target address latched in a prior retirement operation to generate TA0'–TA3'. The selective substitution is performed in response to the second set of non-EOM branch signals 181 generated by the event circuit 104. As described earlier, the second set of non-EOM branch signals 181 identify which one, if any, of the retiring micro-op of the current retirement operation is a corresponding EOM marked pseudo branch effecting micro-op.

For an embodiment where it is possible for the non-EOM marked branch effecting micro-op and the corresponding EOM marked pseudo branch effecting micro-op to be considered for retirement in the same retirement operation, the target address saving circuitry illustrated is further assisted by the event circuit 104 not allowing the EOM marked pseudo branch effecting micro-op to retire in the same retirement operation as the non-EOM marked branch effecting micro-op, thereby ensuring the proper target address will be substituted when the EOM marked pseudo branch target effecting micro-op is consider for retirement again.

Figure 11:
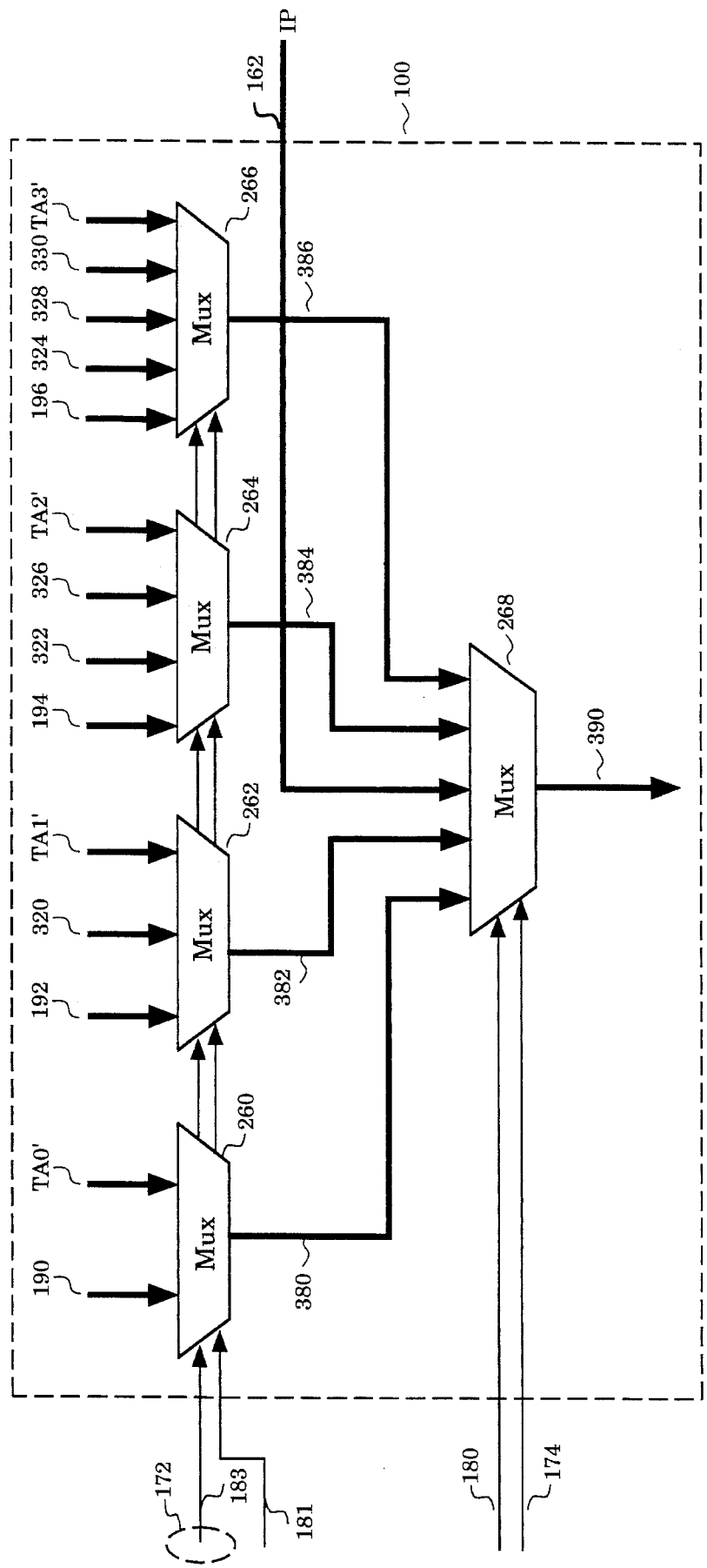
FIG. 11 illustrates circuitry of the instruction pointer logic circuit that conditionally selects one of the speculative new macro instruction pointer values for the instruction pointer register.

FIG. 11 illustrates circuitry of the instruction pointer logic circuit 100 for selecting a new macro instruction pointer value 390. The instruction pointer logic circuit 100 transfers the new macro instruction pointer value 390 to the instruction pointer register 124 over the instruction pointer bus 162.

A set of multiplexers 260 through 266 are controlled by the set of branch signals 183 and the set of non-EOM branch signals 181. As described earlier, the branch signals 183 are the branch flags received over the retirement bus 170 for the retiring micro-ops rm_0 through rm_3, and the set of non-EOM branch signals 181 are received from the event circuit 104 denoting which one, if any, of the retiring micro-ops is an EOM marked pseudo branch effecting micro-op.

Additionally, a multiplexer 268 is controlled by the guarantee signals 180 and the flow markers 174 for the retiring micro-ops rm_0 through rm_3. As described earlier, the guarantee signals 180 are received from the event circuit 104 denoting which one of the micro-ops, if any, can actually retire, and the flow markers 174 are received over the retirement bus 170 for the retiring micro-ops rm_0 through rm_3.

The multiplexer circuit 260 selects an IP value 380 from the target address TA0' and the sum 190 according the branch signals 183 and the non-EOM branch signals 181. The multiplexer circuit 260 couples the target address TA0' to the IP value 380 if either the branch signals 183 indicate that the retiring micro-op rm_0 is a branch effecting micro-op or the non-EOM branch signal 181 indicate that the retiring micro-op rm_0 is a pseudo branch effecting micro-op. If the retiring micro-op rm_0 is not a branch effecting micro-op nor pseudo branch effecting micro-op, the multiplexer circuit 260 couples the sum 190 to the IP value 380.

The multiplexer circuit 262 selects an IP value 382 from the sum 192, the sum 320, and the target address TA1' according to the branch signals 183 and the non-EOM branch signals 181. The multiplexer circuit 262 couples the target address TA1' to the IP value 382 if either the branch signals 183 indicate that the retiring micro-op rm_1 is a branch effecting micro-op or the non-EOM branch signals 181 indicate that the retiring micro-op rm_1 is a pseudo branch effecting micro-op. If the retiring micro-op rm_1 is not a branch effecting micro-op nor a pseudo branch-effecting micro-op, the multiplexer circuit 262 couples the sum 320 to the IP value 382 if either the branch signals 183 indicate that the retiring micro-op rm_0 is a branch effecting micro-op or the non-EOM branch signals 181 indicate that the retiring micro-op is a pseudo branch effecting micro-op. Otherwise, the multiplexer circuit 262 couples the sum 192 to the IP value 382.

The multiplexer circuit 264 selects an IP value 384 from the sum 194, the sum 322, the sum 326, and the target address TA2' according to the branch signals 183 and the non-EOM branch signals 181. The multiplexer circuit 264 couples the target address TA2' to the IP value 384 if either the branch signals 183 indicate that the retiring micro-op rm_2 is a branch effecting micro-op or the non-EOM branch signal indicate that the retiring micro-op rm_2 is a pseudo branch effecting micro-op. If the retiring micro-op rm_2 is not a branch effecting micro-op nor a pseudo branch effecting micro-op, the multiplexer circuit 264 couples the sum 326 to the IP value 384 if either the branch signals 183 indicate that the retiring micro-op rm_1 is a branch effecting micro-op or the non-EOM branch signals 181 indicate that the retiring micro-op rm_1 is a pseudo branch effecting micro-op. If retiring micro-ops rm_1 and rm_2 are not branch effecting micro-ops nor pseudo branch effecting micro-ops, the multiplexer circuit 264 couples the sum 322 to the IP value 384 if either the branch signals 183 indicate that the retiring micro-op rm_0 is a branch effecting micro-op or the non-EOM branch signals 181 indicate that the retiring micro-op rm_0 is a pseudo branch effecting micro-op. Otherwise, the multiplexer circuit 264 couples the sum 194 to the IP value 384.

The multiplexer circuit 266 selects an IP value 386 from the sum 196, the sum 324, the sum 328, the sum 330, and the target address TA3' according to the branch signals 183 and the non-EOM branch signals 181. The multiplexer circuit 266 couples the target address TA3' to the IP value 386 if either the branch signals 183 indicate that the retiring micro-op rm_3 is a branch effecting micro-op or the non-EOM branch signals 181 indicate that the retiring micro-op rm_3 is a pseudo branch effecting micro-op. If the retiring micro-op rm_3 is not a branch effecting micro-op nor pseudo branch effecting micro-op, the multiplexer circuit 266 couples the sum 330 to the IP value 386 if either the branch signals 183 indicate that the retiring micro-op rm_2 is a branch effecting micro-op or the non-EOM branch signals 181 indicate that the retiring micro-op rm_2 is a pseudo branch effecting micro-op. If retiring micro-ops rm_2 and rm_3 are not branch effecting micro-op nor pseudo branch effecting micro-ops, the multiplexer circuit 266 couples the sum 328 to the IP value 386 if either the branch signals 183 indicate that the retiring micro-op rm_1 is a branch effecting micro-op or the non-EOM branch signals 181 indicate that the retiring micro-op rm_1 is a pseudo branch effecting micro-op. If retiring micro-ops rm_1 through rm_3 are not branch effecting micro-ops nor pseudo branch effecting micro-ops, the multiplexer circuit 266 couples the sum 324 to the IP value 386 if either the branch signals 183 indicate that the retiring micro-op rm_0 is a branch effecting micro-op or the non-EOM branch signals 181 indicate that the retiring micro-op rm_0 is a pseudo branch effecting micro-op. Otherwise, the multiplexer circuit 266 couples the sum 196 to the IP value 386.

The multiplexer circuit 268 selects the new macro IP value 390 from the IP values 380–386 and the current macro IP value. The multiplexer circuit 268 couples the IP value 386 to the new macro IP value 390 if the guarantee signals 180 indicate that the retiring micro-op rm_3 is guaranteed to retire and if the flow markers 174 indicate a EOM marker for the retiring micro-op rm_3.

If the retiring micro-op rm_3 is not guaranteed to retire or does not have an EOM marker, the multiplexer circuit 268 couples the IP value 384 to the new macro IP value 390 if the guarantee signals 180 and the flow markers 174 indicate that the retiring micro-op rm_2 is guaranteed to retire and has an EOM marker.

If the retiring micro-op rm_3 is not guaranteed to retire or does not have an EOM marker or if the retiring micro-op rm_2 is not guaranteed to retire or does not have an EOM marker, the multiplexer circuit 268 couples the IP value 382 to the new macro IP value 390 if the guarantee signals 180 and the flow markers 174 indicate that the retiring micro-op rm_1 is guaranteed to retire and has an EOM marker.

If the retiring micro-op rm_3 is not guaranteed to retire or does not have an EOM marker or if the retiring micro-op rm_2 is not guaranteed to retire or does not have an EOM marker or if the retiring micro-op rm_1 is not guaranteed to retire or does not have an EOM marker, the multiplexer circuit 268 couples the IP value 380 to the new macro IP value 390 if the guarantee signals 180 and the flow markers 174 indicate that the retiring micro-op rm_0 is guaranteed to retire and has an EOM marker.

Otherwise, if the guarantee signals 180 indicate that none of the retiring micro-ops rm_0–rm_3 are guaranteed to retire and at the same time has an EOM marker, then the new macro IP value 390 is equal to the current IP value.

Figure 12:
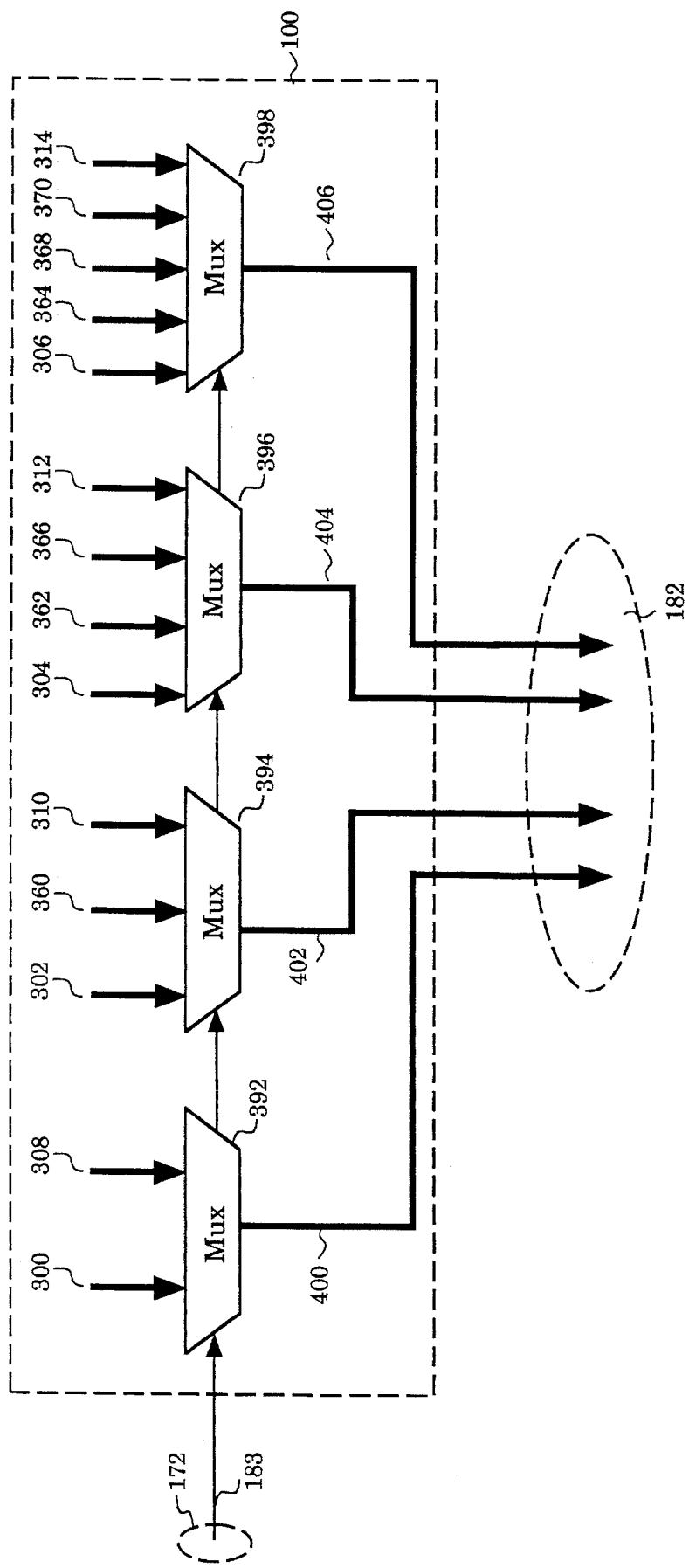
FIG. 12 illustrates circuitry of the instruction pointer logic circuit that selects the instruction pointer limit violation signals for the event circuit.

FIG. 12 illustrates circuitry of the instruction pointer logic circuit 100 for selecting the instruction pointer limit violation signals for the event circuit. A set of multiplexers 392 through 398 are controlled by the set of branch signals 183. As described earlier, the branch signals 183 are the branch flags received over the retirement bus 170 for the retiring micro-ops rm_0 through rm_3.

The multiplexer circuit 392 selects an instruction pointer limit violation signal 400 from the instruction pointer limit violation signals 300 and 308 according the branch signals 183. The multiplexer circuit 392 couples the instruction pointer limit violation signal 308 to the instruction pointer limit violation signal 400 if the branch signals 183 indicate that the retiring micro-op rm_0 is a branch effecting micro-op. If the retiring micro-op rm_0 is not a branch effecting micro-op, the multiplexer circuit 392 couples the instruction pointer limit violation signal 300 to the instruction pointer limit violation signal 400.

The multiplexer circuit 394 selects one of instruction pointer limit violation signals 302, 360, and 310 according to the branch signals 183. The multiplexer circuit 394 couples the instruction pointer limit violation signal 310 to the instruction pointer limit violation signal 400 if the branch signals 183 indicate that the retiring micro-op rm_1 is a branch effecting micro-op. If the retiring micro-op rm_1 is not a branch effecting micro-op, the multiplexer circuit 394 couples the instruction pointer limit violation signal 360 to the instruction pointer limit violation signal 400 if the branch signals 183 indicate that the retiring micro-op rm_0 is a branch effecting micro-op. Otherwise, the multiplexer circuit 394 couples the instruction pointer limit violation signal 302 to the instruction pointer limit violation signal 400.

The multiplexer circuit 396 selects one of the instruction pointer limit violation signals 304, 362, 366, and 312 according to the branch signals 183. The multiplexer circuit 396 couples the instruction pointer limit violation signal 312 to the instruction pointer limit violation signal 400 if the branch signals 183 indicate that the retiring micro-op rm_2 is a branch effecting micro-op. If the retiring micro-op rm_2 is not a branch effecting micro-op, the multiplexer circuit 396 couples the instruction pointer limit violation signal 366 to the instruction pointer limit violation signal 400 if the branch signals 183 indicate that the retiring micro-op rm_1 is a branch effecting micro-op. If retiring micro-ops rm_1 and rm_2 are not branch effecting micro-ops, the multiplexer circuit 264 couples the instruction pointer limit violation signal 362 to the instruction pointer limit violation signal 400 if the branch signals 183 indicate that the retiring micro-op rm_0 is a branch effecting micro-op. Otherwise, the multiplexer circuit 396 couples the instruction pointer limit violation signal 304 to the instruction pointer limit violation signal 400.

The multiplexer circuit 398 selects one of instruction point limit violation siganls according to the branch signals 183. The multiplexer circuit 398 couples the instruction pointer limit violation signal 314 to the instruction pointer limit violation signal 400 if the branch signals 183 indicate that the retiring micro-op rm_3 is a branch effecting micro-op. If the retiring micro-op rm_3 is not a branch effecting micro-op, the multiplexer circuit 398 couples the instruction pointer limit violation signal 370 to the instruction pointer limit violation signal 400 if the branch signals 183 indicate that the retiring micro-op rm_2 is a branch effecting micro-op. If retiring micro-ops rm_2 and rm_3 are not branch effecting micro-op, the multiplexer circuit 398 couples the instruction pointer limit violation signal 368 to the instruction pointer limit violation signal 400 if the branch signals 183 indicate that the retiring micro-op rm_1 is a branch effecting micro-op. If retiring micro-ops rm_1 through rm_3 are not branch effecting micro-ops, the multiplexer circuit 398 couples the instruction pointer limit violation signal 364 to the instruction pointer limit violation signal 400 if the branch signals 183 indicate that the retiring micro-op rm_0 is a branch effecting micro-op. Otherwise, the multiplexer circuit 398 couples the instruction pointer limit violation signal 306 to the instruction pointer limit violation signal 400.

In the foregoing specification the invention has been described with reference to specific exemplary embodiments thereof. It will, however, be evident that various modifications and changes may be made thereto without departing from the broader spirit and scope of the invention as set forth in the appended claims. In particular, the present invention may be practiced on a computer system that does not implement memory segmentation without any of the detail on code segment limit checking. The present invention may be practiced on a computer system with more or less circuitry to accommodate more or less flexibility in the generation of branch effecting micro-ops. The present invention may be practiced on a computer system that does not implement micro-op expansions for macro instructions without any of the detail on eliminating duplicate contributions to new macro instruction pointer value determinations. The present invention may be practiced on a computer system with fixed macro and/or micro instruction sizes without any of the detail on storing and reading the macro instruction sizes. The specification and drawings are accordingly to be regarded as illustrative rather than a restrictive sense.

What is claimed is:

1. In an out-of-order execution processor having a next instruction pointer, a method for maintaining said next instruction pointer, said method comprising the steps of:

(a) reading a set of reorder buffer entries, the reorder buffer entries storing a set of branch information and speculative result data values of a set of instructions, said reorder buffer entries being arranged in a sequential program order of said instructions;

(b) determining a plurality of speculative new next instruction pointers in view of the content of said set of reorder buffer entries and individual instruction sizes of said instructions, each of said speculative new next instruction pointers indicating what said next instruction pointer should be for a particular combination of the speculative result data values if the particular combination of speculative result data values are committed to a committed non-speculative state; and (c) updating said next instruction pointer using one of said determined speculative new next instruction pointers in accordance to which combination of the speculative result data values, if any, are actually being committed to the committed non-speculative state;

wherein, said steps (a) through (c) are performed at each speculative execution result commitment cycle.

2. In an out-of-order execution processor having a next instruction pointer, an apparatus for maintaining said next instruction pointer, said apparatus comprising:

(a) reorder circuitry for storing a plurality of reorder buffer entries having branch information and speculative result data values of a plurality of instructions, said reorder buffer entries being arranged in a sequential program order of said instructions;

(b) calculation circuitry coupled to said reorder circuitry for reading a set of said reorder buffer entries, determining a plurality of speculative new next instruction pointers in view of the content of said set of reorder buffer entries and individual instruction sizes of said set of instructions, each of said speculative new next instruction pointers indicating what said next instruction pointer should be for a particular combination of the speculative result data values in said set of reorder buffer entries if the particular combination of speculative result data values are committed to a committed non-speculative state, and updating said next instruction pointer using one of said determined speculative new next instruction pointers in accordance to which combination of the speculative result data values, if any, are actually being committed to the committed non-speculative state, said reading, determining, and updating being performed at each speculative execution result commitment cycle; and (c) event detection circuitry coupled to said calculation circuitry for generating for said calculation circuitry a set of commitment signals indicating which combination of the speculative result data values, if any, are being committed to the committed non-speculative state, said generating being performed at each speculative execution result commitment cycle also, said calculation circuitry updating said next instruction pointer using one of said determined speculative new next instruction pointers in accordance to said set of commitment signals.

3. An out-of-order execution processor comprising:

(a) real register circuitry comprising real registers for storing data in a committed non-speculative state and a next instruction pointer register for storing a next instruction pointer;

(b) reorder circuitry for storing a plurality of reorder buffer entries having branch information and speculative result data values of a plurality of instructions, said reorder buffer entries being arranged in a sequential program order of said instructions;

(c) calculation circuitry coupled to said real register and reorder circuitry for reading a set of said reorder buffer entries, determining a plurality of speculative new next instruction pointers in view of the contents of said set of reorder buffer entries and individual instruction sizes of said set of instructions, each of said speculative new next instruction pointers indicating what said next instruction pointer should be for a particular combination of the speculative result data values if the particular combination of speculative result data values are committed to the committed non-speculative state, and conditionally updating said next instruction pointer in said real register circuitry using one of said determined speculative new next instruction pointers in accordance to which combination of the speculative result data values, if any, are actually being committed to the committed non-speculative state and stored into said real registers, said reading, determining, and updating being performed at each speculative execution result commitment cycle; and (c) event detection circuitry coupled to said calculation circuitry for generating for said calculation circuitry a set of commitment signals indicating which combination of the speculative result data values, if any, are being committed to the committed non-speculative state, said generating being performed at each speculative execution result commitment cycle, said calculation circuitry updating said next instruction pointer using one of said determined speculative new next instruction pointers in accordance to said set of commitment signals.

4. A computer system comprising:

(a) a memory subsystem for storing instructions and data; and (b) a processor coupled to said memory subsystem for fetching, issuing, and executing said instructions, said processor having (b.1) real register circuitry comprising real registers for storing a subset of said data in a committed non-speculative state and a next instruction pointer register for storing a next instruction pointer;

(b.2) reorder circuitry for storing a plurality of reorder buffer entries having branch information and speculative result data values of a plurality of instructions, said reorder buffer entries being arranged in a sequential program order of said instructions; and (b.3) calculation circuitry coupled to said real register and reorder circuitry for reading a set of said reorder buffer entries, determining a plurality of speculative new next instruction pointers in view of the contents of said set of reorder buffer entries and individual instruction sizes of said set of instructions, each of said speculative new next instruction pointers indicating what said next instruction pointer should be for a particular combination of the speculative result data values if the particular combination of speculative result data values are committed to the committed non-speculative state, and conditionally updating said next instruction pointer in said real register circuitry using one of said determined speculative new next instruction pointers in accordance to which combination of speculative result data values, if any, are actually being committed to the committed non-speculative state and store into said real registers, said reading, determining, and updating being performed at each speculative execution result commitment cycle; and (b.4) event detection circuitry coupled to said calculation circuitry for generating for said calculation circuitry a set of commitment signals indicating which combination of the speculative result data values, if any, are being committed to the committed non-speculative state, said generating being performed at each speculative execution result commitment cycle, said calculation circuitry updating said next instruction pointer using one of said determined speculative new next instruction pointers in accordance to said set of commitment signals.

5. In an out-of-order execution processor having a next instruction pointer, a method for maintaining said next instruction pointer, said method comprising the steps of:

(a) reading a set of instructions buffered for reordering into a sequential program order in view of the instructions having been potentially executed out-of-order comprising branch information and speculative result data values of said set of instructions;

(b) determining a plurality of speculative new next instruction pointers in view of the branch information, speculative result data values, and individual instruction sizes of said instructions, each of said speculative new next instruction pointers indicating what said next instruction pointer should be for a particular combination of the speculative result data values if the particular combination of speculative result data values are committed to a committed non-speculative state; and (c) updating said next instruction pointer using one of said determined speculative new next instruction pointers in accordance to which combination of the speculative result data values, if any, are actually being committed to the committed non-speculative state;

wherein said steps (a) through (c) are performed at each speculative execution result commitment cycle.

6. In an out-of-order execution processor having a next instruction pointer, an apparatus for maintaining said next instruction pointer, said apparatus comprising:

(a) reorder circuitry for storing and reordering a plurality of instructions into a sequential program order in view of the instructions having been potentially executed out-of-order comprising branch information and speculative result data values of said instructions;

(b) calculation circuitry coupled to said reorder circuitry for reading a set of said instructions, determining a plurality of speculative new next instruction pointers in view of branch information, speculative result data values, and individual instruction sizes of said set of instructions, each of said speculative new next instruction pointers indicating what said next instruction pointer should be for a particular combination of the speculative result data values if the particular combination of speculative result data values are committed to a committed non-speculative state, and updating said next instruction pointer using one of said determined speculative new next instruction pointers in accordance to which combination of the speculative result data values, if any, are actually being committed to the committed non-speculative state, said reading, determining, and updating being performed at each speculative execution result commitment cycle; and (c) event detection circuitry coupled to said calculation circuitry for generating for said calculation circuitry a set of commitment signals for said set of said instructions indicating which combination of the speculative result data values, if any, are being committed to said committed non-speculative state, said generating being performed at each speculative execution result commitment cycle, said calculation circuitry updating said next instruction pointer using one of said speculative new next instruction pointers in accordance to said commitment signals.

7. In an out-of-order execution processor having a next macro instruction pointer and a plurality of macro instructions, wherein a sequence of one or more micro-ops is issued for each macro instruction with a branch effecting micro-op of a branch macro instruction always issued as the last micro-op of the micro-op sequence, a method for maintaining said next macro instruction pointer, said method comprising the steps of:

(a) reading a set of micro-ops buffered for reordering into a sequential program order in view of the micro-ops having been potentially executed out-of-order comprising branch information and speculative result data values of said set of micro-ops;

(b) determining a plurality of speculative new next instruction pointers in view of the branch information and speculative result data values of said set of micro-ops, and individual macro instruction sizes of said set of micro-ops' macro instructions, each of said speculative new next macro instruction pointers indicating what said next macro instruction pointer should be for a particular combination of the speculative result data values if the particular combination of speculative result data values are committed to a committed non-speculative state; and (c) updating said next macro instruction pointer using one of said determined speculative new next macro instruction pointers in accordance to which combination of the speculative result data values, if any, are actually being committed to the committed non-speculative state;

wherein said steps (a) through (c) are performed at each speculative execution result commitment cycle.

8. The method of claim 7, wherein, said step (a) comprises reading a first micro-op, and a second micro-op immediately following said first micro-op in said sequential program order;

said step (b) comprises the steps of:

(b.1) computing a first speculative new next macro instruction pointer for said first micro-op by conditionally adding a first macro instruction size of said first micro-op's macro instruction to said next macro instruction pointer depending on whether said first micro-op is the last micro-op of a micro-op sequence;

(b.2) computing a second speculative new next macro instruction pointer for said first micro-op by setting said second speculative next macro instruction pointer of said first micro-op to equal a predetermined portion of the result data value of said first micro-op as if said first micro-op is a branch effecting micro-op and said predetermined portion of the result data value of said first micro-op is a branch target address;

(b.3) computing a first speculative new next macro instruction pointer for said second micro-op by conditionally adding said first macro instruction size of said first micro-op's macro instruction and/or a second macro instruction size of said second micro-op's macro instruction to said next macro instruction pointer depending on whether said first micro-op is the last micro-op of a micro-op sequence and whether said second micro-op is the last micro-op of a micro-op sequence;

(b.4) computing a second speculative new next macro instruction pointer for said second micro-op by conditionally adding said second macro instruction size of said second micro-op's macro instruction to said predetermined portion of the result data value of said first micro-op depending on whether said second micro-op is the last micro-op of a micro-op sequence; and (b.5) computing a third speculative new next macro instruction pointer for said second micro-op by setting said third speculative next macro instruction pointer of said second micro-op to equal a predetermined portion of the result data value of said second micro-op as if said second micro-op is a branch effecting micro-op and said predetermined portion of the result data value of said second micro-op is a branch target address.

9. The method of claim 8, wherein, said step (c) comprises the steps of:

(c.1) selecting one of said first and second speculative new next macro instruction pointers computed for said first micro-op based on whether said first micro-op is a branch effecting micro-op; and (c.2) selecting one of said first, second, and third speculative new next macro instruction pointers computed for said second micro-op based on whether said first micro-op is a branch effecting micro-op and whether said second micro-op is a branch effecting micro-op.

10. The method of claim 9, wherein, said step (c) further comprises the step of:

(c.3) updating said next macro instruction pointer using one of said selected speculative new next instruction pointers of said first and second micro-ops in accordance to which combination of the speculative result data values of said first and second micro-ops, if any, are actually being committed to the committed non-speculative state.

11. In an out-of-order execution processor having a next macro instruction pointer, wherein a sequence of one or more micro-ops is issued for each macro instruction with a branch effecting micro-op of a branch macro instruction always issued as the last micro-op of the micro-op sequence, an apparatus for maintaining said next instruction pointer, said apparatus comprising:

(a) reorder circuitry for storing and reordering a plurality of micro-ops into a sequential program order in view of the micro-ops having been potentially executed out-of-order comprising branch information and speculative result data values of said micro-ops;

(b) calculation circuitry coupled to said reorder circuitry for reading a set of said micro-ops, determining a plurality of speculative new next macro instruction pointers in view of branch information, speculative result data values, and individual macro instruction sizes of said set of micro-ops' macro instructions, each of said speculative new next macro instruction pointers indicating what said next macro instruction pointer should be for a particular combination of the speculative result data values if the particular combination of speculative result data values are committed to a committed non-speculative state, and updating said next macro instruction pointer using one of said determined speculative new next macro instruction pointers in accordance to which combination of the speculative result data values, if any, are actually being committed to the committed non-speculative state, said reading, determining, and updating being performed at each speculative execution result commitment cycle; and (c) event detection circuitry coupled to said calculation circuitry for generating for said calculation circuitry a set of commitment signals for said set of said micro-ops indicating which combination of speculative result data values, if any, are being committed to said committed non-speculative state, said generating being performed at each speculative execution result commitment cycle, said calculation circuitry updating said next macro instruction pointer using one of said speculative new next instruction pointers in accordance to said commitment signals.

12. The apparatus of claim 11, wherein, said calculation circuitry comprises:

(b.1) first generation circuitry for generating a first speculative new next macro instruction pointer for a first micro-op at each speculative execution result commitment cycle by Conditionally adding a first macro instruction size of said first micro-op's macro instruction to said next macro instruction pointer depending on whether said first micro-op is the last micro-op of a micro-op sequence;

(b.2) second generation circuitry coupled to said reorder circuitry for generating a second speculative new next macro instruction pointer for said first micro-op at each speculative execution result commitment cycle by setting said second speculative next macro instruction pointer of said first micro-op to a predetermined portion of the result data value of said first micro-op as if said first micro-op is a branch effecting micro-op and said predetermined portion of the result data value of said first micro-op is a branch target address;

(b.3) third generation circuitry for generating a first speculative new next macro instruction pointer for a second micro-op at each speculative execution result commitment cycle by conditionally adding said first macro instruction size of said first micro-op's macro instruction and a second macro instruction size of said second micro-op's macro instruction to said next macro instruction pointer depending on whether said first micro-op is the last micro-op of a micro-op sequence and whether said second micro-op is the last micro-op of a micro-op sequence;

(b.4) fourth generation circuitry coupled to said reorder circuitry for generating a second speculative new next macro instruction pointer for said second micro-op at each speculative execution result commitment cycle by conditionally adding said second macro instruction size of said second micro-op's macro instruction to said predetermined portion of the result data value of said first micro-op depending on whether said second micro-op is the last micro-op of a micro-op sequence; and (b.5) fifth generation circuitry coupled to said reorder circuitry for generating a third speculative new next macro instruction pointer for said second micro-op at each speculative execution result commitment cycle by setting said third Speculative new next macro instruction pointer to a predetermined portion of the result data value of said second micro-op as if said second micro-op is a branch effecting micro-op and said predetermined portion of the result data value of said second micro-op is a branch target address.

13. The apparatus of claim 12, wherein, said calculating circuitry further comprises:
(b.6) first selection circuitry coupled to said reorder circuitry, and said first and second generation circuitry for selecting one of said first and second speculative new next macro instruction pointers generated for said first micro-op at each speculative execution result commitment cycle based on whether said first micro-op is a branch effecting micro-op; and
(b.7) second selection circuitry coupled to said reorder circuitry, and said third, fourth and fifth generation circuitry for selecting one of said first, second, and third speculative new next macro instruction pointers generated for said second micro-op based on whether said first micro-op is a branch effecting micro-op and whether said second micro-op is a branch effecting micro-op at each speculative execution result commitment cycle.

14. The apparatus of claim 13, wherein, said calculating circuitry further comprises:
(b.8) third selection circuitry coupled to said first and second selection circuitry and said event circuitry for selecting one of said selected speculative new next instruction pointers of said first and second micro-ops at each speculative execution result commitment cycle in accordance to which combination of the speculative result data values of said first and second micro-ops, if any, are actually being committed to the committed non-speculative state.

15. In an out-of-order execution processor having a next macro instruction pointer and a plurality of macro instructions, wherein a sequence of one or more micro-ops is issued for each macro instruction with a branch effecting micro-op of a branch macro instruction issued in any number of positions in the micro-op sequence, a method for maintaining said next macro instruction pointer, said method comprising the steps of:
(a) reading a set of micro-ops buffered for reordering into a sequential program order in view of the micro-ops having been potentially executed out-of-order comprising branch information and speculative result data values of said set of micro-ops;
(b) determining a plurality of speculative new next instruction pointers in view of the branch information and speculative result data values of said set of micro-ops, and individual macro instruction sizes of said set of micro-ops' macro instructions, each of said speculative new next macro instruction pointers indicating what said next macro instruction pointer should be for a particular combination of the speculative result data values if the particular combination of speculative result data values are committed to a committed non-speculative state; and
(c) updating said next macro instruction pointer using one of said determined speculative new next macro instruction pointers in accordance to which combination of the speculative result data values, if any, are actually being committed to the committed non-speculative state;
wherein said steps (a) through (c) are performed at each speculative execution result commitment cycle.

16. The method of claim 15, wherein,
said step (a) comprises reading a first micro-op, and a second micro-op immediately following said first micro-op in said sequential program order;
said step (b) comprises the steps of:
(b.1) computing a first speculative new next macro instruction pointer for said first micro-op at each speculative execution result commitment cycle by conditionally adding a first macro instruction size of said first micro-op's macro instruction to said next macro instruction pointer depending on whether said first micro-op is the last micro-op of a micro-op sequence;
(b.2) computing a second speculative new next macro instruction pointer for said first micro-op at each speculative execution result commitment cycle by setting said second speculative next macro instruction pointer of said first micro-op to equal a predetermined portion of the result data value of said first micro-op as if said first micro-op is a branch effecting micro-op and said predetermined portion of the result data value of said first micro-op is a branch target address;
(b.3) computing a first speculative new next macro instruction pointer for said second micro-op at each speculative execution result commitment cycle by conditionally adding said first macro instruction size of said first micro-op's macro instruction and a second macro instruction size of said second micro-op's macro instruction to said next macro instruction pointer depending on whether said first micro-op is the last micro-op of a micro-op sequence and whether said second micro-op is the last micro-op of a micro-op sequence;
(b.4) computing a second speculative new next macro instruction pointer for said second micro-op at each speculative execution result commitment cycle by conditionally adding said second macro-instruction size of said second micro-op's macro instruction to said predetermined portion of the result data value of said first micro-op depending on whether said second micro-op is the last micro-op of a micro-op sequence; and
(b.5) computing a third speculative new next macro instruction pointer for said second micro-op at each speculative execution result commitment cycle by setting said third speculative next macro instruction pointer of said second micro-op to equal either said predetermined portion of the result data value of said first micro-op as if said second micro-op is a pseudo branch effecting micro-op, or a predetermined portion of the result data value of said second micro-op as if said second micro-op is a branch effecting micro-op and said predetermined portion of the result data value of said second micro-op is a branch target address, depending on whether said first micro-op is a branch effecting micro-op.

17. The method of claim 16, wherein,
said step (c) comprises the steps of:
(c.1) selecting one of said first and second speculative new next macro instruction pointers computed for said first micro-op at each speculative execution result commitment cycle based on whether said first micro-op is a branch effecting or pseudo branch effecting micro-op; and
(c.2) selecting one of said first, second, and third speculative new next macro instruction pointers determined for said second micro-op at each speculative execution result commitment cycle based on whether said first micro-op is a branch effecting micro-op and whether said second micro-op is a branch effecting or pseudo branch effecting micro-op.

18. The method of claim 17, wherein,
   said step (c) further comprises the step of:
   (c.3) updating said next macro instruction pointer using one of said selected speculative new next instruction pointers of said first and second micro-ops at each speculative execution result commitment cycle in accordance to which combination of the speculative result data values of said first and second micro-ops, if any, are being committed to the committed non-speculative state.

19. In an out-of-order execution processor having a next macro instruction pointer, wherein a sequence of one or more micro-ops is issued for each macro instruction with a branch effecting micro-op of a branch macro instruction always issued as the last micro-op of the micro-op sequence, an apparatus for maintaining said next instruction pointer, said apparatus comprising:

(a) reorder circuitry for storing and reordering a plurality of micro-ops into a sequential program order in view of the micro-ops having been potentially executed out-of-order comprising branch information and speculative result data values of said micro-ops;

(b) calculation circuitry coupled to said reorder circuitry for reading a set of said micro-ops, determining a plurality of speculative new next macro instruction pointers in view of branch information, speculative result data values, and individual macro-instruction sizes of said set of micro-ops' macro instructions, each of said speculative new next macro instruction pointers indicating what said next macro instruction pointer should be for a particular combination of the speculative result data values if the particular combination of speculative result data values are committed to a committed non-speculative state, and updating said next macro instruction pointer using one of said determined speculative new next macro instruction pointers in accordance to which combination of the speculative result data values, if any, are actually being committed to the committed non-speculative state, said reading, determining, and updating being performed at each speculative execution result commitment cycle; and (c) event detection circuitry coupled to said calculation circuitry for generating for said calculation circuitry a set of commitment signals for said set of said micro-ops indicating which combination of the speculative result data values, if any, are being committed to said committed non-speculative state, said generating being performed at each speculative execution result Commitment Cycle, said calculation circuitry updating said next macro instruction pointer using one of said speculative new next instruction pointers in accordance to said commitment signals.

20. The apparatus of claim 19, wherein, said calculation circuitry comprises:

(b.1) first generation circuitry for generating a first speculative new next macro instruction pointer for a first micro-op at each speculative execution result commitment cycle by conditionally adding a first macro instruction size of said first micro-op's macro instruction to said next macro instruction pointer depending on whether said first micro-op is the last micro-op of a micro-op sequence;

(b.2) second generation circuitry coupled to said reorder circuitry for generating a second speculative new next macro instruction pointer for said first micro-op at each speculative execution result commitment cycle by setting said second speculative new next macro instruction pointer to a predetermined portion of the result data value of said first micro-op as if said first micro-op is a branch effecting micro-op and said predetermined portion of the result data value of said first micro-op is a branch target address;

(b.3) third generation circuitry for generating a first speculative new next macro instruction pointer for a second micro-op at each speculative execution result commitment cycle by conditionally adding said first macro instruction size of said first micro-op's macro instruction and a second macro instruction size of said second micro-op's macro instruction to said next macro instruction pointer depending on whether said first micro-op is the last micro-op of a micro-op sequence and whether said second micro-op is the last micro-op of a micro-op sequence;

(b.4) fourth generation circuitry coupled to said reorder circuitry for generating a second speculative new next macro instruction pointer for said second micro-op at each speculative execution result commitment cycle by conditionally adding said second macro instruction size of said second micro-op's macro instruction to said predetermined portion of the result data value of said first micro-op depending on whether said second micro-op is the last micro-op of a micro-op sequence;; and (b.5) fifth generation circuitry coupled to said reorder circuitry for generating a third speculative new next macro instruction pointer for said second micro-op at each speculative execution result commitment cycle by setting said third speculative new next macro instruction pointer to either said predetermined portion of the result data value of said first micro-op as if said second micro-op is a pseudo branch effective micro-op or a predetermined portion of the result data value of said second micro-op as if said second micro-op is a branch effecting micro-op and said predetermined portion of the result data value of said second micro-op is a branch target instruction, depending on whether said first micro-op is a branch effecting micro-op.

21. The apparatus of claim 20, wherein, said calculating circuitry further comprises:

(b.6) first selection circuitry coupled to said reorder circuitry, and said first and second generation circuitry for selecting one of said first and second speculative new next macro instruction pointers generated for said first micro-op at each speculative execution result commitment cycle based on whether said first micro-op is a branch effecting micro-op;

(b.7) second selection circuitry coupled to said reorder circuitry, and said third, fourth and fifth generation circuitry for selecting one of said first, second, and third speculative new next macro instruction pointers generated for said second micro-op at each speculative execution result commitment cycle based on whether said first micro-op is a branch effecting micro-op, and whether said second micro-op is a branch effecting or pseudo branch effecting micro-op.

22. The apparatus of claim 21, wherein, said calculating circuitry further comprises:

(b.8) third selection circuitry coupled to said first and second selection circuitry and said event circuitry for selecting one of said selected speculative new next instruction pointers of said first and second micro-ops at each speculative execution result commitment cycle in accordance to which combination of the speculative result data values of said first and second micro-ops, if any, are actually being committed to the committed non-speculative state.

* * * * *

UNITED STATES PATENT AND TRADEMARK OFFICE
CERTIFICATE OF CORRECTION

PATENT NO.  :  5,463,745
DATED  :  October 31, 1995
INVENTOR(S)  :  Vidwans et al.

It is certified that error appears in the above-identified patent and that said Letters Patent is hereby corrected as shown below:

In column 11, at line 34, replace "Imop_0" with --lmop_0--, and replace "Imop_3" with --lmop_3--

In column 11, at line 36, replace "(Isrc1 and Isrc2)" with --(lsrc1 and lsrc2)--

In column 11, at line 37, replace "(Idst)" with --(ldst)--

In column 11, at line 39, replace "Isrc1 and Isrc2" with --lsrc1 and lsrc2--, and replace "Idst" with --ldst--

In column 11, at line 48, replace "Imop_0" with --lmop_0--

In column 11, at line 49, replace "Imop_3" with --lmop_3--

In column 11, at line 53, replace "Imop_0" with --lmop_0--, and replace "Imop_3" with --lmop_3--

In column 11, at line 66, replace "Imop_0" with --lmop_0--, and replace "Imop_3" with --lmop_3--

In column 12, at line 9, replace "Isrc1" with --lsrc1--, and replace "Imop_0" with --lmop_0--

In column 12, at line 17, replace "Isrc1" with --lsrc1--

In column 12, at line 23, replace "Isrc2" with --lsrc2--, and replace "Imop_0" with --lmop_0--

In column 12, at line 30, replace "Isrc2" with --lsrc2--

In column 12, at line 35, replace "Idst" with --ldst--

UNITED STATES PATENT AND TRADEMARK OFFICE
CERTIFICATE OF CORRECTION

PATENT NO. : 5,463,745

DATED : October 31, 1995

INVENTOR(S) : Vidwans et al.

It is certified that error appears in the above-identified patent and that said Letters Patent is hereby corrected as shown below:

In column 12, at line 36, replace "Imop_0" with --lmop_0--

In column 12, at line 42, replace "Idst_0" with --ldst_0--, and replace "Idst_3" with ldst_3--

In column 12, at line 46, replace "Idst_0" with --ldst_0--, replace "Idst_3" with --ldst_3--, and replace "destinations Idst" with --destinations ldst--

In column 12, at line 47, replace "Imop_0" with --lmop_0--, and replace "Imop_3" with --lmop_3--

In column 12, at line 50, replace "Imop_0" with --lmop_0--, and replace "Imop_3" with --lmop_3--

In column 13, at line 52, replace "Idst_0" with --ldst_0--, and replace "Idst_3" with --ldst_3--

In column 13, at line 55, replace "Idst_0" with --ldst_0--

In column 13, at line 56, replace "Idst_3" with --ldst_3--

In column 13, at line 67, replace "Idst_0" with --ldst_0--

In column 14, at line 38, replace "Idst" with --ldst--

In column 15, at line 14, replace "rm 3" with --rm_3--

In column 15, at line 19, replace "Idst" with --ldst--

In column 15, at line 23, replace "Idst" with --ldst--

In column 18, at line 42, replace "rm._0" with --rm_0--

In column 19, at line 19, replace "IPΔI'" with --IPΔ1'--

UNITED STATES PATENT AND TRADEMARK OFFICE
CERTIFICATE OF CORRECTION

PATENT NO.  : 5,463,745
DATED       : October 31, 1995
INVENTOR(S) : Vidwans et al.

It is certified that error appears in the above-identified patent and that said Letters Patent is hereby corrected as shown below:

In column 30, at line 22, replace "Conditionally" with --conditionally--

In column 30, at line 63, replace "Speculative" with --speculative--

In column 33, at lines 50-51, replace "Commitment Cycle" with --commitment cycle--

In column 34, at line 37, replace "micro-op or" with --micro-op, or--

Signed and Sealed this

Fourth Day of February, 1997

BRUCE LEHMAN

Attest:

Attesting Officer

Commissioner of Patents and Trademarks